(12) United States Patent
Nie et al.

(10) Patent No.: US 11,420,422 B2
(45) Date of Patent: Aug. 23, 2022

(54) SWITCHABLE OPTICAL DEVICE AND METHOD FOR MANUFACTURING OF A SWITCHABLE OPTICAL DEVICE

(71) Applicant: Merck Patent GmbH, Darmstadt (DE)

(72) Inventors: Chuan Nie, Eindhoven (NL); Ties De Jong, En Utrecht (NL)

(73) Assignee: Merck Patent GmbH, Darmstadt (DE)

( * ) Notice: Subject to any disclaimer, the term of this patent is extended or adjusted under 35 U.S.C. 154(b) by 15 days.

(21) Appl. No.: 17/262,432

(22) PCT Filed: Jul. 22, 2019

(86) PCT No.: PCT/EP2019/069622
§ 371 (c)(1),
(2) Date: Jan. 22, 2021

(87) PCT Pub. No.: WO2020/020804
PCT Pub. Date: Jan. 30, 2020

(65) Prior Publication Data
US 2021/0373392 A1 Dec. 2, 2021

(30) Foreign Application Priority Data
Jul. 24, 2018 (EP) .................................... 18185131

(51) Int. Cl.
*B32B 17/10* (2006.01)
*G02F 1/1343* (2006.01)
(Continued)

(52) U.S. Cl.
CPC ........ *B32B 17/10* (2013.01); *B32B 17/10036* (2013.01); *B32B 17/10045* (2013.01);
(Continued)

(58) Field of Classification Search
CPC ............... G02F 1/1345; G02F 1/13452; G02F 1/13458; E06B 2009/2464;
(Continued)

(56) References Cited

U.S. PATENT DOCUMENTS

2005/0190332 A1* 9/2005 Yano ................. B32B 17/10036
349/149
2013/0265511 A1* 10/2013 Poix .................. B32B 17/10761
349/33
(Continued)

FOREIGN PATENT DOCUMENTS

WO 17198585 A1 11/2017

OTHER PUBLICATIONS

R. Baetens et al., "Properties, requirements and possibilities of smart windows for dynamic daylight and solar energy control in buildings: A state-of-the-art review", Solar Energy Materials & Solar Cells 94 (2010), pp. 87-105.
(Continued)

*Primary Examiner* — Jessica M Merlin
(74) *Attorney, Agent, or Firm* — Millen White Zelano & Branigan, PC; Brion P. Heaney

(57) ABSTRACT

A switchable optical device is provided having a first substrate (11), a second substrate (12) and a seal (114). The two substrates (11, 12) and the seal (114) are arranged such that a cell having a cell gap is formed and a switchable medium (10) is located inside the cell gap. The first substrate (11) has a first transparent electrode (21) and the second substrate (12) has a second transparent electrode (22). The electrodes (21, 22) are facing towards the cell gap. The two substrates (11, 12) are arranged such that the first substrate (11) has a first region (71) adjacent to a first edge (41) of the first substrate (11) which does not overlap with the second substrate (12) and the second substrate (12) has a second
(Continued)

region (72) which does not overlap with the first substrate (11). A first electrically conducting busbar (31) is arranged in the first region (71) and a second electrically conducting busbar (32) is arranged in the second region (72). A first terminal is electrically connected to the first busbar (31) and a second terminal is electrically connected to the second busbar (32). The first substrate (11) and the second substrate (12) each have an edge deletion (116) in which the respective transparent electrode (21, 22) is removed. The edge deletion (116) is complete on the edges non-adjacent to a busbar (31, 32) and there is no edge deletion or only partial edge deletion on edges adjacent to a busbar (31, 32).

Further aspects of the invention relate to a method for designing a switchable optical device, a method for driving a switchable optical device, a method for manufacturing a switchable optical device and a system comprising a switchable optical device and a controller for driving the switchable optical device.

19 Claims, 3 Drawing Sheets

(51) Int. Cl.
*G02F 1/1337* (2006.01)
*G02F 1/1345* (2006.01)
*E06B 9/24* (2006.01)

(52) U.S. Cl.
CPC .. *B32B 17/10155* (2013.01); *B32B 17/10183* (2013.01); *B32B 17/10467* (2013.01); *B32B 17/10504* (2013.01); *E06B 9/24* (2013.01); *G02F 1/1345* (2013.01); *G02F 1/13452* (2013.01); *G02F 1/13458* (2013.01); *G02F 1/133769* (2021.01); *G02F 1/134381* (2021.01); *E06B 2009/2464* (2013.01); *G02F 2201/12* (2013.01); *G02F 2202/022* (2013.01); *G02F 2202/16* (2013.01)

(58) Field of Classification Search
CPC ........ B32B 17/10467; B32B 17/10486; B32B 17/10495; B32B 17/10504; B32B 17/10513; B32B 17/10522; B32B 17/10532; B32B 17/10183; B32B 17/10155
See application file for complete search history.

(56) References Cited

U.S. PATENT DOCUMENTS

| | | | |
|---|---|---|---|
| 2014/0043668 A1* | 2/2014 | Bergh | B32B 17/06 264/1.7 |
| 2014/0376075 A1* | 12/2014 | Dubrenat | G02F 1/155 359/265 |
| 2015/0116638 A1* | 4/2015 | Zhang | G02F 1/13452 349/86 |
| 2018/0259822 A1* | 9/2018 | Dixit | B23K 26/38 |
| 2019/0212601 A1 | 7/2019 | De Jong | |

OTHER PUBLICATIONS

International Search Report PCT/EP2019/069622 dated Sep. 20, 2019 (pp. 1-5).

* cited by examiner

SWITCHABLE OPTICAL DEVICE AND METHOD FOR MANUFACTURING OF A SWITCHABLE OPTICAL DEVICE

The invention relates to a switchable optical device having two substrates and a seal, the two substrates and the seal being arranged such that a cell having a cell gap is formed, a switchable medium being located inside the cell gap, the first substrate having a first transparent electrode and the second substrate having a second transparent electrode, the electrodes facing towards the cell gap, the two substrates being arranged such that a first substrate has a first region adjacent to a first edge of the first substrate which does not overlap with a second substrate and that the second substrate has a second region adjacent to a second edge of the second substrate which does not overlap with the first substrate.

Further aspects of the invention relate to a method for designing a switchable optical device, a method for driving a switchable optical device, a method for manufacturing a switchable optical device and a system comprising a switchable optical device and a controller for driving the switchable optical device.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal based devices employ a change in the orientation of liquid crystal molecules between two conductive electrodes by applying an electric field which results in a change of their transmittance.

For switching a smart window from one state to another state, an electrical driving signal is applied. Liquid crystal based smart windows are usually driven with an AC voltage. For switching the state, the voltage over the liquid crystal needs to reach a threshold voltage. Especially for large windows the voltage at the center area is found to be less than at other locations of the window. In order to achieve a uniform appearance of the window, a voltage distribution over the area of the windows should be as uniform as possible. Further, the electrical connection should be reliable and should be protected from the environment to ensure a long-term stability of the smart window.

Document US 2013/265511 A1 discloses a liquid-crystal multiple glazing including a first glass sheet and a second glass sheet that is sealed by a sealing gasket. The first glass sheet protrudes by a first protruding side and includes an electricity supply zone. The electricity supply zone includes electrical cabling and an insulating material. A third glass sheet is laminated with the second glass sheet, the third glass sheet protruding from the second glass sheet by a side covering the electrically insulating material.

It is an object of the invention to provide an improved switchable optical device which is reliable and allows uniform switching even for large devices. Further objects of the invention include providing a method for designing such a switchable optical device, a method for driving such a switchable optical device, and a method for manufacturing such a switchable optical device.

A switchable optical device is provided. The switchable optical device has a first substrate, a second substrate and a seal. The two substrates and the seal are arranged such that a cell having a cell gap is formed and a switchable medium is located inside the cell gap. The first substrate has a first transparent electrode and the second substrate has a second transparent electrode. The electrodes are facing towards the cell gap. The two substrates are arranged such that the first substrate has a first region adjacent to a first edge of the first substrate which does not overlap with the second substrate and the second substrate has a second region which does not overlap with the first substrate. A first electrically conducting busbar is arranged in the first region and a second electrically conducting busbar is arranged in the second region. A first terminal is electrically connected to the first busbar and a second terminal is electrically connected to the second busbar.

The first substrate and the second substrate each have an edge deletion in which the respective transparent electrode is removed. The edge deletion is complete on the edges non-adjacent to a busbar. On edges adjacent to the busbar, there is no edge deletion or only partial edge deletion.

The area covered by the busbar itself is preferably not part of the partial edge deletion of the edge adjacent to this busbar. Areas adjacent to an edge which are not covered by a busbar are preferably part of the edge deletion.

The substrates are preferably optically transparent. The first and second substrate may be independently selected from a polymer or a glass. Suitable glass substrates include, for example, float glass, downdraw glass, chemically toughened glass, borosilicate glass and aluminosilicate glass.

Suitable polymer substrates include, for example, polyethylene terephthalate (PET), polyethylene naphthalate (PEN), polymethyl methacrylate (PMMA), polycarbonate (PC), polyimide (PI), COP (cyclic olefin polymers) and cellulose triacetate (TAC).

The two substrates of the switchable optical device may have different shapes and sizes. Alternatively, the two substrates are of the same size and shape. The substrates may, for example be of square, rectangular or triangle shape. Other shapes are also possible.

The two substrates and the switchable medium are arranged as a cell wherein the switchable medium is placed in the gap formed by the two substrates. The size of the gap is preferably from 1 μm to 300 μm, preferably from 3 μm to 100 μm and more preferably from 5 μm to 100 μm, and most preferably from 10 μm to 50 μm. The cell is usually sealed by means of glue lines located at or near the edges. Examples of suitable materials for sealing of the cell include, epoxy based sealants, polyurethanes, hot melt sealants and acrylates.

To maintain a proper thickness of the cell, in particular of the liquid crystal layer, spacers may be distributed inside the gap. Typically, the non-conductive spacers have a spherical shape with a predetermined diameter and may, for example, be made of polymer or glass.

The two substrates of the switchable optical device are arranged such that each of the substrates has at least one region which does not overlap with the other substrate. These non-overlapping regions provide access to the respective transparent electrode and the busbars are located in these non-overlapping regions. If a substrate has more than one non-overlapping region, a busbar or several busbars may be provided in some or in each of the non-overlapping regions.

The non-overlapping region is preferably an offset between the first and second substrate which is in the range of from 1 mm to 20 mm, preferably from 2 mm to 10 mm and for example about 4 mm.

Each of the two substrates has a transparent electrode which is used to control the state of the switchable medium, in particular the liquid crystal medium. The switchable optical medium is arranged between the two transparent substrates and the state of the switchable optical medium may be controlled by applying an AC driving voltage to the two transparent electrodes.

A transparent electrode is an electrically conductive layer which allows at least partial transmission of visible light through the material. The transparency may be wavelength dependent such that only certain wavelengths or wavelength ranges of light are transmitted through the transparent electrode. In this case, light passing through the transparent electrode will have a colored appearance. The light transmission through the transparent electrode may also be uniform in the visible wavelength range so that light passing through the transparent electrode has a gray or white appearance. Preferably, the visible light passing through the transparent electrode is not scattered.

The transparent electrode is preferably a layer of an electrically conducting oxide such as indium-tin-oxide (ITO), fluorine doped tin oxide (FTO) or doped zinc oxide or a conductive polymer such as poly(3,4-ethylenedioxythiophene) (PEDOT), poly(3,4-ethylenedioxythiophene) polystyrene sulfonate (PEDOT:PSS), or poly(4,4-dioctyl cyclopentadithiophene). The transparent electrode is preferably applied to the substrate by a coating process.

Preferably, the sheet resistance of the first transparent electrode and/or the second transparent electrode is less than 100 Ohm/square for a switchable optical device wherein a distance between the first busbar and the second busbar is less than 1.8 m. For a distance between the two busbars of from 1.8 m to less than 2.6 m, the sheet resistance is preferably less than 50 Ohm/square and the sheet resistance is preferably less than 30 Ohm/square for a distance from 2.6 m to 3.5 m.

In addition to the transparent electrodes, the substrates may comprise one or more additional coatings such as insulating layers and/or passivation layers.

For example, a top coating may be applied to the transparent electrodes. A top coating is an electrically insulating film located on the side of the respective electrode which faces away from the respective substrate. The material of the top coating is preferably selected from silicon oxide ($SiO_2$), $SiO_xN_x$, and silicon oxynitride. Further, other non-conductive layers may be used.

As a further example, the transparent electrode may be embedded between two passivation layers. The passivation layers may be silicon oxide ($SiO_2$) layers.

Further, an alignment layer or film may be arranged on one or both transparent electrodes such that the alignment layer is in contact with the switchable medium. The alignment film may be rubbed in an alignment direction.

One or more of the additional coatings and/or the transparent electrodes themselves are partially removed by means of edge deletion.

Edge deletion is a process wherein in a region adjacent to at least a part of one edge of the substrate at least one layer of coating of the substrate is removed. In case of the switchable optical device, the first and second substrates are coated with the first and second transparent electrode, respectively.

By means of the edge deletion, the transparent electrode layer and optionally further layers, such as insulating or passivation layers are selectively removed. Advantageously, by selectively removing the transparent electrode layer in a region adjacent to at least one edge of the respective substrate, exposure of the transparent electrode to the environment is avoided or at least minimized. This prevents corrosion of the transparent electrode and thus improves reliability of the switchable optical device.

Further, the edge deletion serves to improve durability of the switchable optical device by preventing that the electric field caused by a driving signal applied to the transparent electrode extends over the seal of the switchable optical device. Strong electric fields can limit the durability of the used sealant. Additionally, edge deletion improves adhesion of sealants as most sealant materials bond better with the substrate than with one of the coatings.

The first and second terminals may be used to provide a connection to a controller or driver which generates a driving signal for controlling the state of the switchable medium located inside the cell gap. The terminal may, for example, be configured as a terminal wire or a connector for attaching a wire. In an alternative embodiment the terminal may also be an extension part from the busbar.

In the case where a terminal is bonded to a busbar, bonding of the terminal to the busbar may be achieved by soldering, welding, or use of a conductive adhesive or a conductive film. In particular, anisotropic conductive film bonding which is a common method for forming electrical contacts in the manufacturing of display devices may be used to bond a flat cable as terminal wire to the respective busbar.

The switchable medium of the switchable optical device comprises at least one liquid-crystalline medium. A liquid-crystalline medium is defined as a material having the properties of a liquid crystal. Typical liquid-crystalline media comprise at least one composition having elongated rod-shaped molecules. The liquid-crystalline media used in conjunction with the present invention have at least two states. In response to an electric field caused by a driving signal applied to the two transparent electrodes a state of the liquid-crystalline medium may be controlled.

For example, the switchable medium, which comprises the at least one liquid-crystalline medium, has a bright state and a dark state. In the bright state, more light is transmitted through the switchable medium than in the dark state. Additionally or alternatively, the switchable medium has a clear state and a scattering state, wherein essentially no light scattering for visible light occurs in the clear state and light is scattered in the scattering state. The switchable medium may also have a combined state, in particular a state which is bright and clear and/or a state which is dark and scattering.

Preferably, the first busbar is constructed as a continuous soldered line in contact with the first transparent electrode and arranged in the first region and/or the second busbar is constructed as a continuous soldered line in contact with the second transparent electrode and arranged in the second region.

By means of soldering, in particular by means of ultrasonic soldering, a conductive material is applied to the first and/or second electrode and forms a continuous line which serves as busbar. Typical solder materials are alloys comprising tin, indium and/or lead.

Preferably, the first busbar is constructed as a first conductive strip which electrically connects the first transparent electrode in the first region and/or the second busbar is constructed as a second conductive strip which electrically connects the second transparent electrode in the second region.

The conductive strip is preferably a metallized line, for example in form of a metal part or other forms of metal applied to the respective transparent electrode. The conductive strip may be a metal strip, for example a copper strip. Alternatively, the conductive strip may be a printed strip which is obtained by applying a conductive material such as silver particles to the first and/or second substrate by means of a printing process.

An electrical connection between a conductive strip and the respective transparent electrode may be achieved by means of soldering, welding or use of a conductive adhesive such as an adhesive tape.

In one embodiment, the electrical connection between a conductive strip and the respective transparent electrode is achieved by a continuous soldered line, continuous welded line or by a continuous line of conductive adhesive.

In another embodiment, the electrical connection between a conductive strip and the respective transparent electrode is achieved by a plurality of soldered dots, welded spots or dots of a conductive adhesive distributed along the length of the respective conductive strip.

The use of a soldered line and/or soldered dots is also preferred when the conductive strip is a printed strip. The continuous soldered line and/or soldered dots ensure a good low-resistance electrical connection between the respective transparent electrode and the printed strip.

Especially if the respective transparent electrode is covered with an insulating layer or a passivation film, the continuous soldered line or soldered dots form an electrical connection with the respective transparent electrode as the insulating layer or passivation film is penetrated by the conductive material used for soldering.

The shape of the busbar preferably corresponds to the shape of the respective edge adjacent to the busbar. If the edge is a straight edge, the busbar has a straight elongated shape. If the edge is curved, the busbar is preferably also curved. Further, it is possible to extend a busbar over two or more adjacent edges.

Preferably, an electrically insulating material is arranged on the first substrate such that a portion of the first transparent electrode located in the first region and the first busbar are encapsulated, more preferably completely encapsulated, by the insulating material and/or an electrically insulating material is arranged on the second substrate such that a portion of the second transparent electrode located in the second region and the second busbar are encapsulated, more preferably completely encapsulated, by the insulating material.

Preferably, the insulating material covers all exposed parts of the respective transparent electrode. It is especially preferred to cover all parts of the respective busbar except the first terminal or second terminal.

The electrically insulating material is preferably selected to have a good adhesion to the substrates and to be capable of withstanding high temperatures which may occur in a lamination process and/or applications. Preferably, the insulating material is selected from the group comprising single component epoxy materials, two component epoxy adhesives, single component silicone materials, two component silicone adhesives, acrylate sealants, polyurethanes, hot melt sealants, UV curing sealants and a combination of at least two of said materials.

Preferably, the edge deletion of the first substrate further includes a portion at a first end and/or a second end of the first edge and/or the edge deletion of the second substrate further includes a portion at a first end and/or a second end of the second edge, wherein the respective portion has a length parallel to the respective edge of at least 2 mm. Preferably, the length of the respective portion is from 5 mm to 100 mm and more preferably from 20 mm to 50 mm. For example, the length parallel to the respective edge may be 30 mm.

By means of this additional portion/these additional portions, a "G" shaped edge deletion is formed.

Preferably, the first terminal is a first terminal wire which is arranged parallel to the first edge and the second terminal is a second terminal wire which is arranged parallel to the second edge, wherein the position and length of the first terminal wire and/or the position and length of the second terminal wire are chosen such that the first terminal wire does not protrude from the first substrate and/or the second terminal wire does not protrude from the second substrate. When combined with a "G" shaped edge deletion, the end of the terminal wire does not interfere with the transparent electrode or the busbar.

In such an arrangement of the terminal wire or wires, the wire is protected when the switchable optical device is handled or stored. Because no wire is protruding, the switchable optical device can safely be placed on any edge which does not have a bus bar.

According to the invention the electrically conducting busbars are arranged in the first and second regions on the substrates. In a preferred embodiment, the busbars are arranged exclusively in these regions. In this embodiment the busbars in particular do not protrude from the substrates, and in this case the terminal wires may also be provided in a facile way such that they also do not protrude from the substrate. It is also possible to laminate a further glass sheet to the switchable optical device. This further glass sheet may protrude such as to cover, preferably completely cover, the region in which the busbar is provided. Alternatively, the further glass sheet may be laminated such that the region in which the busbar is provided is not covered at all. In a further embodiment, the further glass sheet is laminated such that it covers the region in which the busbar is provided, however a corner of the sheet is cut or respectively omitted, where particularly preferably and advantageously the connection of the busbar with the terminal, in particular the terminal wire, is made in this corner-cut part where the laminated sheet is thus not covering the region in which the busbar is provided.

In another embodiment the terminal wire may protrude from the substrate. It is also possible to make use of a connector.

According to the invention it is also possible as an alternative that the electrically conducting busbars may be provided such that they are only in part arranged in the first and second regions on the substrates. In particular, in this alternative embodiment the electrically conducting busbar, which in this case is arranged in the non-overlapping region only partially, extends beyond the substrate. In this embodiment it is preferred that the terminal is electrically connected to said busbar in the part which extends beyond or respectively protrudes from the substrate. In case a further sheet is laminated, this sheet preferably also does not cover the area in which the electrical connection between the terminal wire and the protruding busbar is made. Preferably, the busbar and in particular the protruding part of the busbar and the connection between the busbar and the terminal wire may be protected, shielded or insulated using tubing, e.g. silicone tubing, preferably together with the use of further encapsulation, e.g. using DELO encapsulant.

Preferably, the edge finish of at least the first edge of the first substrate and/or of at least the second edge of the second substrate is a rounded edge, pencil edge, bevel edge or arrised edge.

In contrast to a flat edge, the edges having one of the preferred edge finishes have an enlarged surface area which is preferably not covered by any coating. Further, the busbars do not extend into the enlarged surface area of the edge finish. This enlarged area provides additional contact area for an electrically insulating material covering a busbar and thus improves adhesion. Further, the mechanical stability of the preferred edge finishes is stronger than for a plain flat edge making it less likely for the respective substrate to become damaged.

When a substrate having one of the preferred edge finishes is viewed from above, the edge finish provides an offset which protrudes from the main (flat) surface area of the substrate. Preferably, the offset is in the range of from 0.1 mm to 2 mm and more preferably in the range of from 0.5 mm to 1 mm.

Preferably, the first terminal and/or the second terminal is/are configured as terminal wire(s) having an electrically insulating jacket. The terminal wire may, for example, have a silicone rubber, PVC or PTFE based jacket.

In an alternative embodiment, the first terminal and/or the second terminal is/are (an) extended part(s) from the busbar, which preferably is/are applied with an insulating jacket, for example, a silicone or PVC tube.

The switchable optical device may comprise further glass sheets which are laminated to the first and/or second substrate.

The switchable optical device is in particular suitable for use as a smart window. Such smart windows may, for example, be used as windows in buildings, and may also be used in transportation applications such as windows of vehicles.

In order to control the state of the switchable optical device, an AC driving signal is applied. In an electrical circuit formed by a driver or controller which acts as AC signal generator, the switchable optical device acts as a resistor-capacitor (RC) circuit having a RC time constant T which depends on the geometry of the cell. In particular, the RC time constant T is dependent on the size or area of the switchable optical device. The frequency of the AC driving signal must by chosen high enough so that no flickering of the switchable optical device is visible to an observer. The frequency of the AC driving signal is preferably in the range of from 20 Hz to 1 kHz, more preferably from 50 Hz to 750 Hz, and is especially preferred in the range of from 100 Hz to 500 Hz. Further, the frequency of the AC driving signal should generally correspond to the RC time constant of the RC circuit so that a uniform electric field and thus a uniform response of the switchable optical device are achieved.

The RC time constant T of the switchable optical device is influenced by the size of the device, the sheet resistance of the electrodes, the size of the cell gap and the dielectric constant of the switchable medium located inside the cell gap and the geometry of the device, such as shape of the device, busbar size and busbar locations.

It is thus a further aspect of the invention to provide a method for designing a switchable optical device as described herein such that the RC time constant $\tau$ of a RC circuit formed between the first terminal and the second terminal is in the range of from 50 ms to 1 µs, preferably from 50 ms to 1 ms, by choosing the sheet resistance of the first transparent electrode and the second transparent electrode in the range of from 10 to 150 Ohm/square and by choosing the cell gap in the range of from 6 µm to 50 µm.

In a preferred embodiment the liquid-crystalline medium has a positive dielectric anisotropy $\Delta\varepsilon$ of $\geq 1.5$, preferably in the range of from 1.5 to 50, more preferably from 3 to 40, and even more preferably from 3 to 30.

According to another embodiment the liquid-crystalline medium has a negative dielectric anisotropy, preferably in the range from −2 to −8, more preferably in the range from −3 to −6, and particularly preferably from −3.5 to −5.

All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The dielectric anisotropy ($\Delta\varepsilon$) is determined at a frequency of 1 kHz. The optical anisotropy ($\Delta n$) is determined at a wavelength of 589.3 nm.

The liquid-crystalline medium preferably has a clearing point, preferably a phase transition from a nematic liquid-crystalline state to an isotropic state, in the temperature range from 70° C. to 170° C., more preferably from 80° C. to 160° C., even more preferably from 90° C. to 150° C. and in particular from 100° C. to 140° C.

It is a further aspect of the present invention to provide a method for electrically driving one of the described switchable optical devices. The method comprises electrically connecting a signal source providing an AC driving signal to the first terminal and the second terminal and generating an AC signal is being generated by the signal source, wherein the frequency of the AC signal is chosen such that the period T of the AC signal is preferably larger than $\tau$ and more preferably larger than $5\tau$. For example, the period T is in the range of from $\tau$ to $5\tau$, wherein $\tau$ is the RC time constant of an RC circuit formed by the arrangement of the first transparent electrode, the second transparent electrode and the switchable medium.

In yet another aspect of the present invention, a method for manufacturing of one of the described switchable optical devices is provided.

In a first step of the method, a first substrate having a first transparent electrode and a second substrate having a second transparent electrode are provided.

In a subsequent second step, edge deletion is performed on the first substrate and on the second substrate wherein the transparent conductive electrodes are removed in an area adjacent to the substrate edges, the edge deletion of the first substrate being only partial for at least a first edge and complete for all further edges of the first substrate and the edge deletion of the second substrate being only partial for at least a second edge and complete for all further edges of the second substrate.

The at least one first edge corresponds to the one or more edges of the first substrate which will be adjacent to a busbar. Accordingly, the at least one second edge corresponds to the one or more edges of the second substrate which will be adjacent to a busbar.

Edge deletion may be performed by pushing a rotating edge deletion wheel against the edge area of a substrate so that the edge deletion wheel mechanically removes one or more layers of coating from the respective substrate. Alternatively, laser ablation may be used for edge deletion.

In a third step, the first substrate, the second substrate and a seal are arranged such that a cell having a cell gap is formed, and the cell is filled with a switchable medium. When forming the cell, the two substrates are arranged such that the first substrate has a first region adjacent to the first edge of the first substrate which does not overlap with the second substrate and that the second substrate has a second region adjacent to the second edge of the second substrate which does not overlap with the first substrate.

Instead of the cell filling as described above, alternatively the switchable medium may be provided by one drop filling on one of the substrates, followed by assembly of the two substrates.

The first and second substrates are then prepared for the connecting of busbars. Preparation of the substrates may include several optional steps such as pre-cleaning and heating.

In an optionally pre-cleaning step, pre-cleaning of the portion of the first transparent electrode located in the first region and of the portion of the second transparent electrode located in the second region may be performed.

In an optional pre-heating step, pre-heating of at least the first region of the first substrate and/or pre-heating of at least the second region of the second substrate is performed. Preferably, the respective substrate is preheated to a temperature in the range of 30° C. to 150° C., especially preferred in the range of from 40° C. to 100° C. Pre-heating will increase the adhesion level and bonding strength of subsequent soldering due to the energy input into the process.

In a subsequent fourth step, a first busbar is connected to the first transparent electrode and a second busbar is connected the second transparent electrode.

If a busbar is configured as a soldered line, a conductive material such as solder material is applied to the respective substrate in order to form the busbar. Applying of the conductive material is preferably done by means of ultrasonic soldering.

Alternatively, a busbar may be configured as a conductive strip. A first conductive strip may be applied to the first transparent electrode and a second conductive strip may be applied to the second transparent electrode. The conductive strip is preferably a metallized line, for example in form of a metal part or other forms of metal applied to the respective transparent electrode. An electrical connection between a conductive strip and the respective transparent electrode may be achieved by means of soldering, welding or use of a conductive adhesive.

In one embodiment, the electrical connection between a conductive strip and the respective transparent electrode is achieved by a continuous soldered line, continuous welded line or by a continuous line of conductive adhesive.

In another embodiment, the electrical connection between a conductive strip and the respective transparent electrode is achieved by a plurality of soldered dots, welded spots or dots of a conductive adhesive distributed along the length of the respective conductive strip.

Alternatively, the conductive strip may be a printed strip which is obtained by applying a conductive material to the first and/or second substrate by means of a printing process.

In a subsequent fifth step, a first terminal is bonded to the first busbar and a second terminal is bonded to the second busbar. It is preferred that this bonding is located in the non-overlapping region on the substrate. In an alternative embodiment however, the busbar, in particular the conductive strip, may extend beyond the substrate and the bonding of the terminal to the busbar can occur outside the substrate region.

Bonding of a terminal to a busbar may be achieved by soldering, welding, use of a conductive adhesive or a conductive film. In particular, anisotropic conductive film bonding which is a common method for forming electrical contacts in the manufacturing of display devices may be used to bond a flat cable as terminal wire to the respective busbar.

In a subsequent sixth step, an insulating material is dispensed on the first substrate such that the portion of the first transparent electrode located in the first region and the first busbar are encapsulated, preferably completely encapsulated, by the insulating material and/or on the second substrate such that the portion of the second transparent electrode located in the second region and the second busbar are encapsulated, preferably completely encapsulated, by the insulating material.

After dispensing of the insulating material, the insulating material is cured.

In an optional subsequent step, a further glass sheet may be laminated to the exposed face of the first substrate and/or the second substrate by means of an interlayer.

For lamination, the interlayer is preferably arranged between the further glass sheet and the switchable optical element. In a subsequent treatment, which usually involves application of heat and/or elevated pressure, the respective sheet, the interlayer and the switchable optical element are bonded. Suitable lamination processes such as autoclave or vacuum bag processing are known in the technical field of laminated (safety) glass.

The first and second substrate may be processed simultaneously or sequentially in the second method step and in steps four to six of the method. For example, after the cell has been formed in step three, steps four to six may first be performed on the first substrate and then on the second substrate.

It is a further aspect of the invention to provide a system comprising at least one of the described switchable optical devices and at least one controller for applying an AC driving signal to the at least one switchable optical device. Preferably, the at least one controller is configured to implement the driving method described herein.

BRIEF DESCRIPTION OF THE DRAWINGS

The drawings show:

FIG. 1 shows a switchable optical device 1 having a first substrate 11 and a second substrate 12. A switchable medium 10 is sandwiched between the two substrates 11, 12, see FIG. 2.

Figure 1:
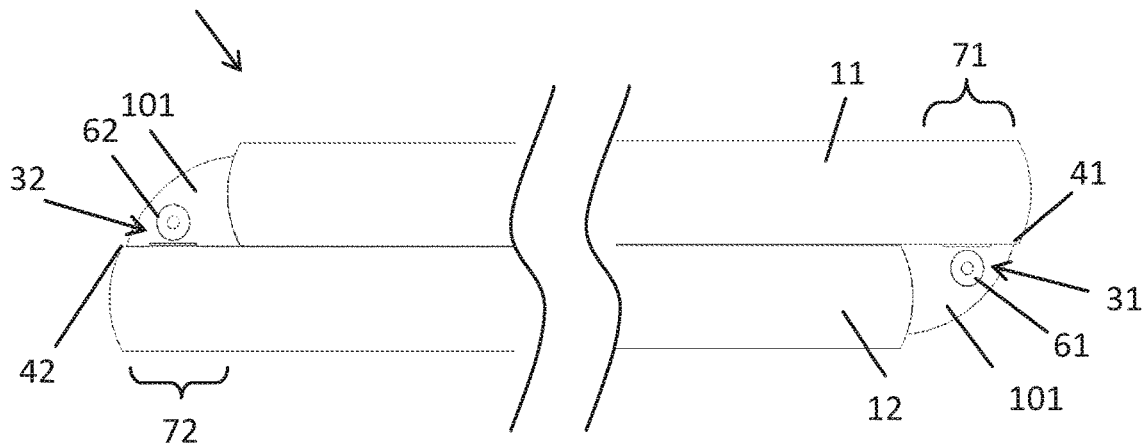
FIG. 1 shows a cross section of a switchable optical device.

The two substrates 11, 12 are arranged such that a first region 71 of the first substrate 11 does not overlap with the second substrate 12 and that a second region 72 does not overlap with the first substrate 11.

Adjacent to a first edge 41 of the first substrate 11, a first busbar 31 is arranged. The first busbar 31 is electrically contacted by a first terminal wire 61 and the first busbar 31 is encapsulated with an insulating material 101.

Adjacent to a second edge 42 of the second substrate 12, a second busbar 32 is arranged. The second busbar 32 is electrically contacted by a second terminal wire 62 and the second busbar 32 is encapsulated with an insulating material 101.

Figure 2:
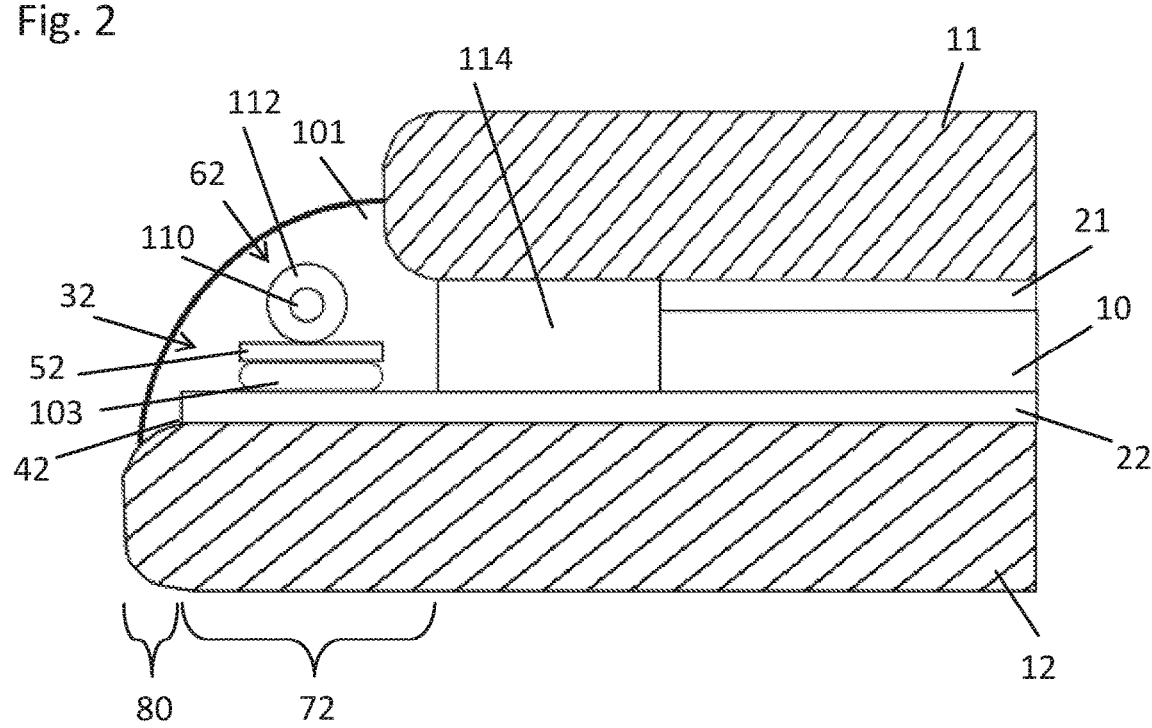
FIG. 2 shows an enlarged view of the cross section of FIG. 1.

FIG. 2 shows an enlarged view of the left half of the cross-sectional view of FIG. 1 which includes the region adjacent to the second edge 42 of the second substrate 12. In the enlarged view, the switchable material 10 which is sandwiched between the two substrates 11, 12 is visible.

The switchable material 10 is part of a cell comprising in this order the first substrate 11, a first transparent electrode 21, the switchable material 10, a second transparent electrode 22 and the second substrate 12. The cell is sealed by a seal 114. As can be seen in FIG. 2, the first transparent electrode 21 has been partially removed by means of edge deletion so that seal 114 is directly in contact with the first substrate 11.

The second busbar 32 is arranged in the second region 72 on the second substrate 12. The second busbar 32 comprises a second conductive strip 52, which is electrically connected to the second electrode 22 by means of a conductive material 32. The conductive material 32 is, for example, a solder material and has been applied in a solder process such as ultrasonic soldering.

As can be seen in the enlarged view of FIG. 2, the second terminal wire 62 is formed by a wire core 110 and an electrically insulating jacket 112. At a position which is not visible in FIG. 2, the wire core 110 is electrically connected to the second conductive strip 52.

The second busbar 32 and the exposed parts of the second transparent electrode 22 which are located in the second region 72 are encapsulated by means of an insulting material 101 which protects and seals the busbar 32.

Further, FIG. 2 shows that the edge finish of the second edge 42 of the second substrate is a rounded or "C" shaped edge. The rounded edge protrudes from the flat area of the second substrate 12 in an edge finish region 80. By means of the edge finish region 80, the contact area between the insulating material 101 and the second substrate 12 is advantageously enlarged which improves adhesion of the insulating material 101.

Figure 3:
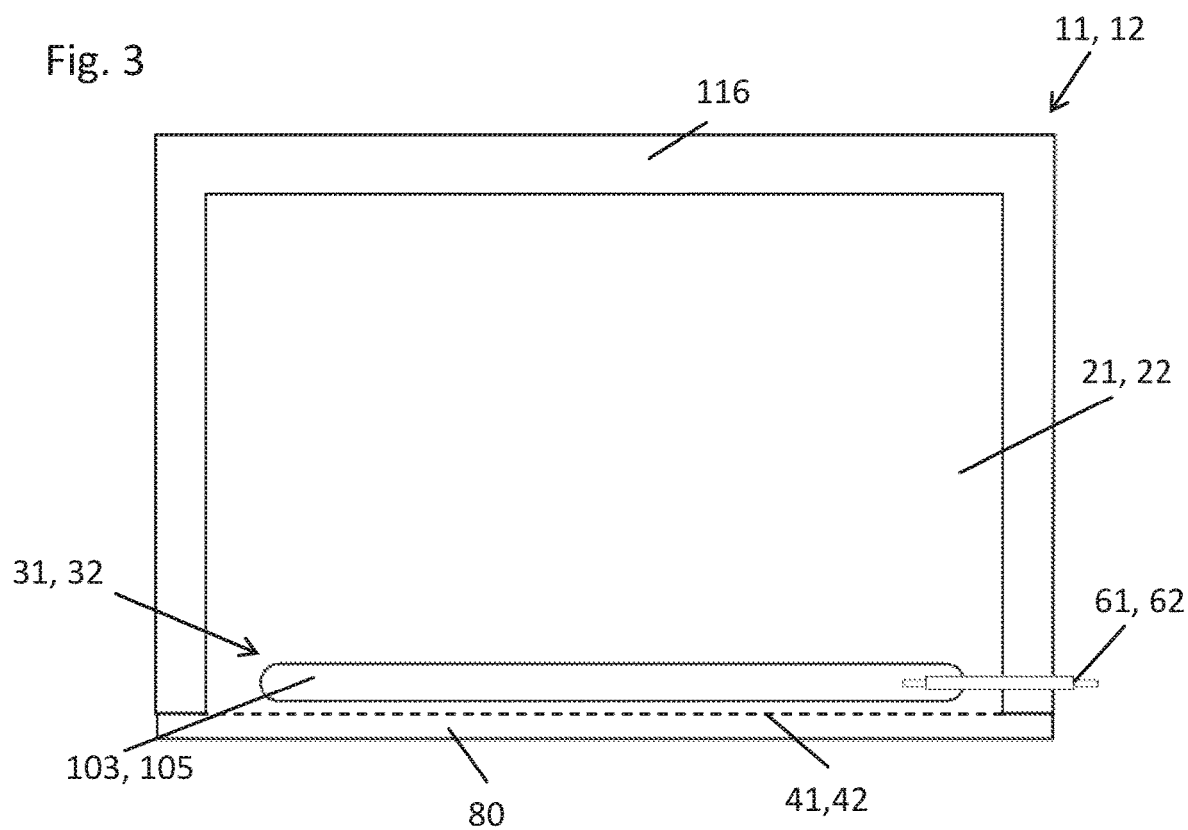
FIG. 3 shows a top view at a substrate with a busbar of a first embodiment.

FIG. 3 shows a top view at a substrate 11, 12 with a busbar 31, 32 of a first embodiment. As can be seen in the top view of FIG. 3, the transparent electrode 21, 22 has been partially removed by means of edge deletion 116. The edge deletion 116 is complete on all edges of the substrate 11, 12 except the edge 41, 42 adjacent to the busbar 31, 32. Also, edge deletion 116 has been performed on the edge finish area 80. There is no edge deletion 116 on the edge 41, 42 adjacent to the busbar 31, 32. The edge deletion 116 is symmetrical.

In the embodiment of FIG. 3, the busbar 31, 32 is a conductive material 103 which is applied to the transparent electrode 21, 22 in form of a continuous soldered line 105. A terminal wire 61, 62 is bonded to the conductive material 103.

Figure 4:
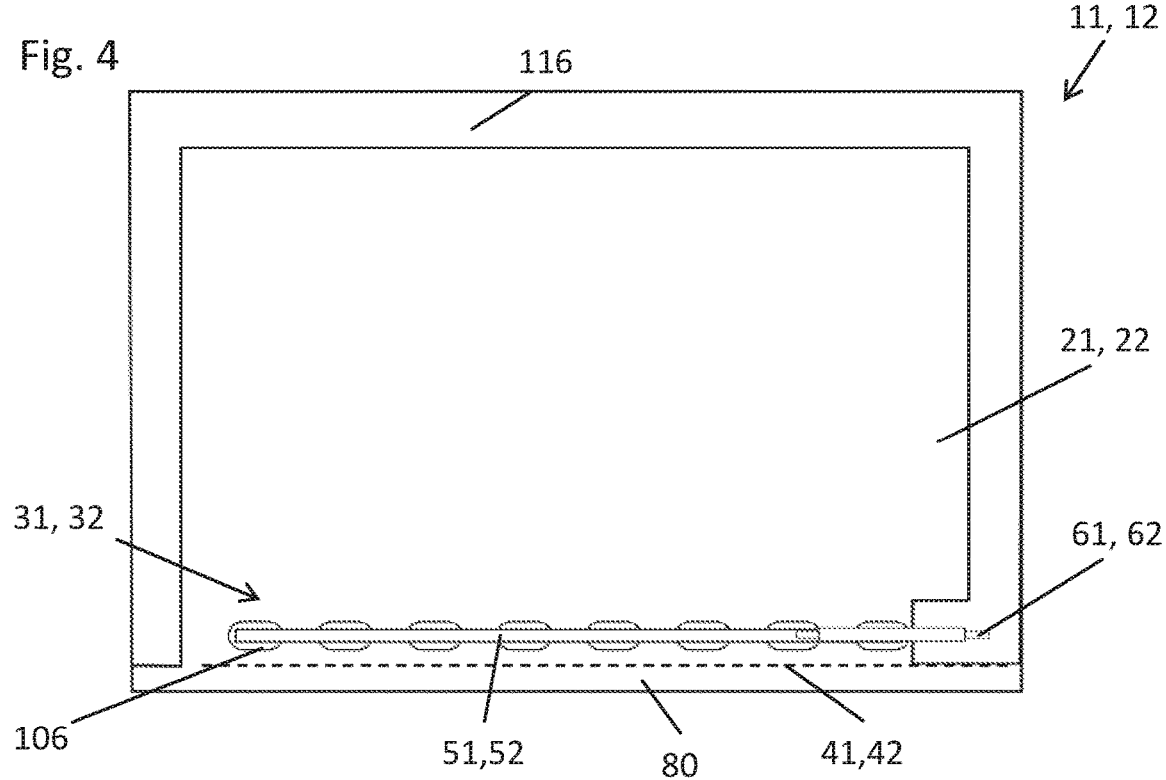
FIG. 4 shows a top view at a substrate with a busbar of a second embodiment.

FIG. 4 shows a top view at a substrate 11, 12 with a busbar 31, 32 of a second embodiment. As can be seen in the top view of FIG. 4, the transparent electrode 21, 22 has been partially removed by means of edge deletion 116. The edge deletion 116 is complete on all edges of the substrate 11, 12 except the edge 41, 42 adjacent to the busbar 31, 32. Also, edge deletion 116 has been performed on the edge finish area 80. Further, there is a partial edge deletion 116 on the edge 41, 42 adjacent to the busbar 31, 32. The edge deletion 116 is asymmetrical.

In the embodiment of FIG. 4, the busbar 31, 32 is a conductive strip 51, 52 in form of a metal part which is electrically connected to the transparent electrode 21, 22 by means of soldered dots 106. A terminal wire 61, 62 is bonded to the conductive strip 51, 52.

Figure 5:
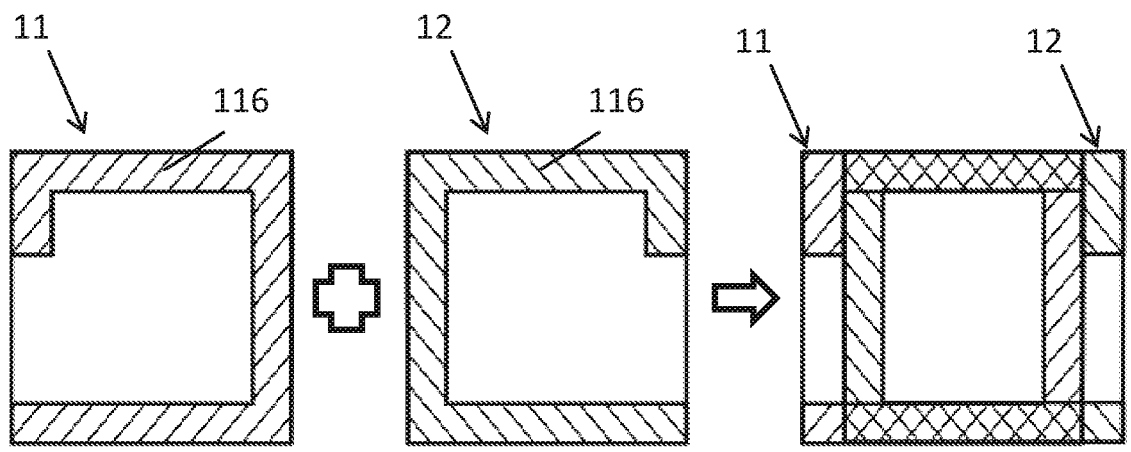
FIG. 5 shows a schematic view of substrates having a first embodiment of edge deletion.

FIG. 5 shows a schematic view of a first substrate 11, a second substrate 12 and an arrangement of the two substrates 11, 12 having a first embodiment of edge deletion. The edge deletion of the respective substrates 11, 12 is incomplete on one edge which is adjacent to a busbar The edge deletion is asymmetric.

Figure 6:
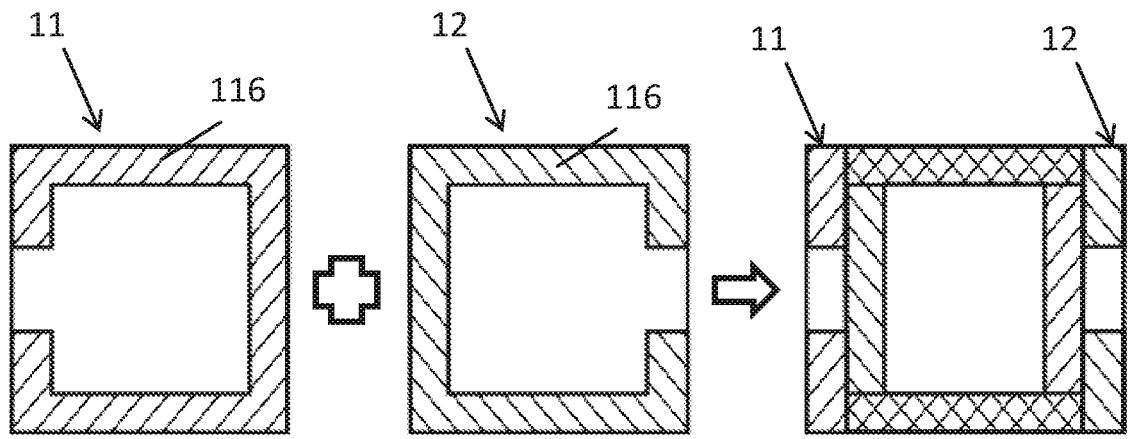
FIG. 6 shows a schematic view of substrates having a second embodiment of edge deletion.

FIG. 6 shows a schematic view of a first substrate 11, a second substrate 12 and an arrangement of the two substrates 11, 12 having a first embodiment of edge deletion. The edge deletion of the respective substrates 11, 12 is incomplete on one edge which is adjacent to a busbar The edge deletion is symmetric.

In a preferred embodiment the switchable medium, in particular the liquid-crystalline medium, is chosen such that it favourably contributes, together with the other elements of the switchable optical device and while being suitably matched with the method for driving the device, to an overall favourable performance, in particular in terms of improved reliability, e.g. with respect to the voltage holding ratio (VHR), and improved stability against unwanted stresses due to light, heat, chemicals or electric fields.

In the following Examples liquid-crystalline media are shown which may particularly favourably and preferably be used.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | (cyclohexane ring) |
| C(CN) | (cyclohexane with CN) |
| P | (phenyl ring) |
| P(F,CN) | (phenyl with F and CN) |
| D | (dioxane ring) |
| DI | (dioxane ring isomer) |

TABLE A-continued
| | Ring elements |
|---|---|
| A | 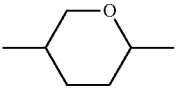 |
| AI | 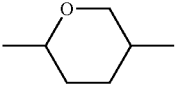 |
| G | 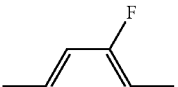 |
| GI | 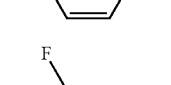 |
| U | 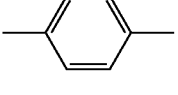 |
| UI | 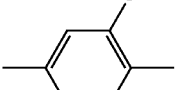 |
| Y | 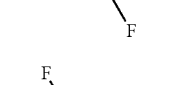 |
| M | 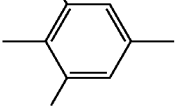 |
| MI | 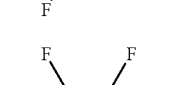 |
| N | 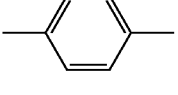 |
| NI | 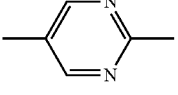 |
| Np | 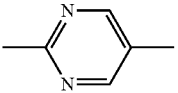 |
| dH | |
| N3f | |
| N3fI | |
| tH | |
| tHI | |
| tH2f | |
| tH2fI | |
| K | |
| KI | |
| L | |

TABLE A-continued

Ring elements

| | |
|---|---|
| LI | (cyclohexene) |
| F | (fluoro-cyclohexene) |
| FI | (fluoro-cyclohexene isomer) |
| Nf | (fluoropyridine) |
| B | (difluoro-dibenzofuran with methyl groups) |
| NfI | (fluoropyridine isomer) |

TABLE B

Linking groups

| | | | |
|---|---|---|---|
| E | —$CH_2CH_2$— | Z | —CO—O— |
| V | —CH=CH— | Zl | —O—CO— |
| X | —CF=CH— | O | —$CH_2$—O— |
| Xl | —CH=CF— | Ol | —O—$CH_2$— |
| B | —CF=CF— | Q | —$CF_2$—O— |
| T | —C≡C— | Ql | —O—$CF_2$— |
| W | —$CF_2CF_2$— | | |

TABLE C

End groups

| Left-hand side | | Right-hand side | |
|---|---|---|---|
| | | Use alone | |
| —n— | $C_nH_{2n+1}$— | —n | —$C_nH_{2n+1}$ |
| —nO— | $C_nH_{2n+1}$—O— | —On | —O—$C_nH_{2n+1}$ |
| —V— | $CH_2$=CH— | —V | —CH=$CH_2$ |
| —nV— | $C_nH_{2n+1}$—CH=CH— | —nV | —$C_nH_{2n}$—CH=$CH_2$ |
| —Vn— | $CH_2$=CH—$C_mH_{2m+1}$— | —Vn | —CH=CH—$C_nH_{2n+1}$ |
| —nVm— | $C_nH_{2n+1}$—CH=CH—$C_nH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —Cl— | Cl— | —Cl | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —OXF— | $CF_2$=CH—O— | —OXF | —O—CH=$CF_2$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| Use together with one another and with others | | | |
| —...A...— | —C≡C— | —...A... | —C≡C— |
| —...V...— | CH=CH— | —...V... | —CH=CH— |
| —...Z...— | —CO—O— | —...Z... | —CO—O— |
| —...Zl...— | —O—CO— | —...Zl... | —O—CO— |
| —...K...— | —CO— | —...K... | —CO— |
| —...W...— | —CF=CF— | —...W... | —CF=CF— | in which n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D
| Illustrative structures | |
|---|---|
| 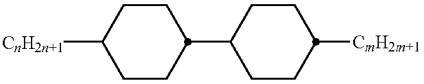 | CC-n-m |
| 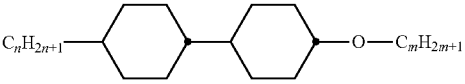 | CC-n-Om |
| 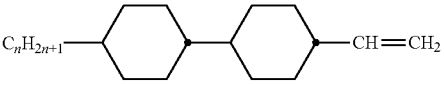 | CC-n-V |
| 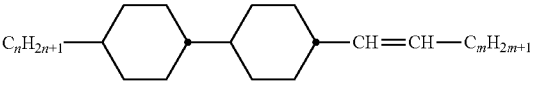 | CC-n-Vm |
| 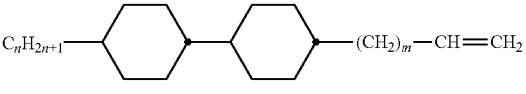 | CC-n-mV |
| 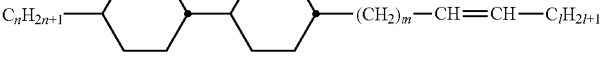 | CC-n-mVl |
| 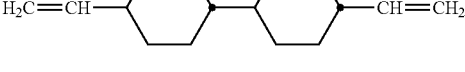 | CC-V-V |
| 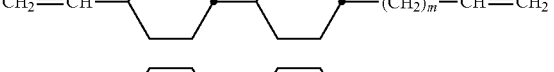 | CC-V-mV |
|  | CC-V-Vm |
|  | CC-Vn-mV |
|  | CC-nV-mV |
| 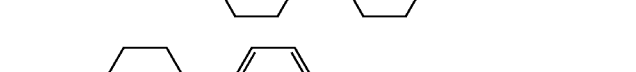 | CC-nV-Vm |
|  | CP-n-m |
|  | CP-nO-m |
| 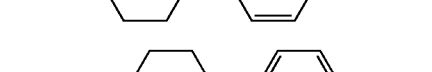 | CP-n-Om |
| 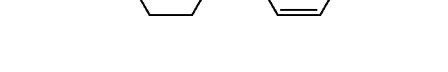 | CP-V-m |

TABLE D-continued

| Illustrative structures | |
|---|---|
| $CH_2=CH-(CH_2)_n$—⟨Cy⟩—⟨Ph⟩—$C_mH_{2m+1}$ | CP-Vn-m |
| $C_nH_{2n+1}$—CH=CH—⟨Cy⟩—⟨Ph⟩—$C_mH_{2m+1}$ | CP-nV-m |
| $H_2C=CH$—⟨Cy⟩—⟨Ph⟩—CH=$CH_2$ | CP-V-V |
| $CH_2=CH$—⟨Cy⟩—⟨Ph⟩—$(CH_2)_m$—CH=$CH_2$ | CP-V-mV |
| $CH_2=CH$—⟨Cy⟩—⟨Ph⟩—CH=CH—$C_mH_{2m+1}$ | CP-V-Vm |
| $CH_2=CH-(CH_2)_n$—⟨Cy⟩—⟨Ph⟩—$(CH_2)_m$—CH=$CH_2$ | CP-Vn-mV |
| $C_nH_{2n+1}$—CH=CH—⟨Cy⟩—⟨Ph⟩—$(CH_2)_m$—CH=$CH_2$ | CP-nV-mV |
| $C_nH_{2n+1}$—CH=CH—⟨Cy⟩—⟨Ph⟩—CH=CH—$C_mH_{2m+1}$ | CP-nV-Vm |
| $C_nH_{2n+1}$—⟨Ph⟩—⟨Ph⟩—$C_mH_{2m+1}$ | PP-n-m |
| $C_nH_{2n+1}$—⟨Ph⟩—⟨Ph⟩—$OC_mH_{2m+1}$ | PP-n-Om |
| $C_nH_{2n+1}$—⟨Ph⟩—⟨Ph⟩—CH=$CH_2$ | PP-n-V |
| $C_nH_{2n+1}$—⟨Ph⟩—⟨Ph⟩—CH=CH—$C_mH_{2m+1}$ | PP-n-Vm |
| $C_nH_{2n+1}$—⟨Ph⟩—⟨Ph⟩—$(C_mH_{2m})$—CH=$CH_2$ | PP-n-mV |
| $C_nH_{2n+1}$—⟨Ph⟩—⟨Ph⟩—$(C_mH_{2m})$—CH=CH—$C_lH_{2l+1}$ | PP-n-mVl |
| $C_nH_{2n+1}$—⟨Cy⟩—⟨Cy⟩—⟨Ph⟩—$C_mH_{2m+1}$ | CCP-n-m |
| $C_nH_{2n+1}O$—⟨Cy⟩—⟨Cy⟩—⟨Ph⟩—$C_mH_{2m+1}$ | CCP-nO-m |

TABLE D-continued

Illustrative structures

| Structure | Code |
|---|---|
| $C_nH_{2n+1}$—[Cy]—[Cy]—[Ph]—$OC_mH_{2m+1}$ | CCP-n-Om |
| $C_nH_{2n+1}$—[Cy]—[Cy]—[Ph]—$CH=CH_2$ | CCP-n-V |
| $C_nH_{2n+1}$—[Cy]—[Cy]—[Ph]—$CH=CH-C_mH_{2m+1}$ | CCP-n-Vm |
| $C_nH_{2n+1}$—[Cy]—[Cy]—[Ph]—$(C_mH_{2m})-CH=CH_2$ | CCP-n-mV |
| $C_nH_{2n+1}$—[Cy]—[Cy]—[Ph]—$(C_mH_{2m})-CH=CH-C_lH_{2l+1}$ | CCP-n-mVl |
| $H_2C=CH$—[Cy]—[Cy]—[Ph]—$C_mH_{2m+1}$ | CCP-V-m |
| $C_nH_{2n+1}-CH=CH$—[Cy]—[Cy]—[Ph]—$C_mH_{2m+1}$ | CCP-nV-m |
| $CH_2=CH-(CH_2)_n$—[Cy]—[Cy]—[Ph]—$C_mH_{2m+1}$ | CCP-Vn-m |
| $C_nH_{2n+1}-CH=CH-(CH_2)_m$—[Cy]—[Cy]—[Ph]—$C_lH_{2l+1}$ | CCP-nVm-l |
| $C_nH_{2n+1}$—[Cy]—[Ph]—[Ph]—$C_mH_{2m+1}$ | CPP-n-m |
| $C_nH_{2n+1}$—[Cy]—[Ph]—[Ph(F)]—$C_mH_{2m+1}$ | CPG-n-m |
| $C_nH_{2n+1}$—[Cy]—[Ph(F)]—[Ph]—$C_mH_{2m+1}$ | CGP-n-m |
| $C_nH_{2n+1}O$—[Cy]—[Ph]—[Ph]—$C_mH_{2m+1}$ | CPP-nO-m |
| $C_nH_{2n+1}$—[Cy]—[Ph]—[Ph]—$OC_mH_{2m+1}$ | CPP-n-Om |
| $H_2C=CH$—[Cy]—[Ph]—[Ph]—$C_mH_{2m+1}$ | CPP-V-m |

TABLE D-continued
Illustrative structures
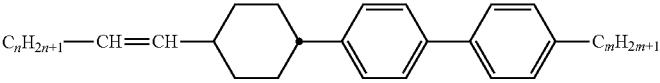 CPP-nV-m
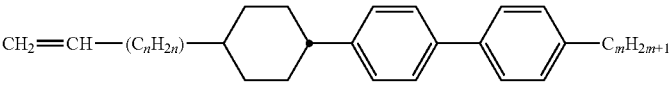 CPP-Vn-m
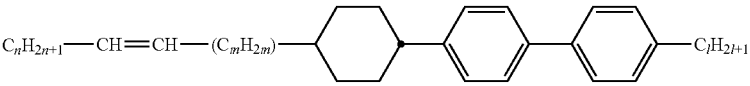 CPP-nVm-I
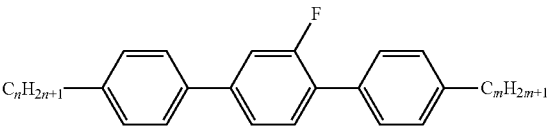 PGP-n-m
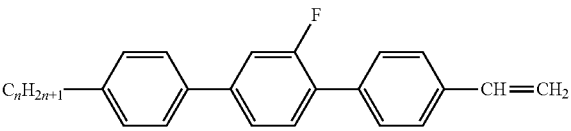 PGP-n-V
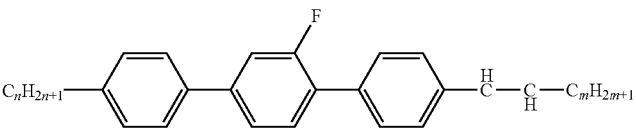 PGP-n-Vm
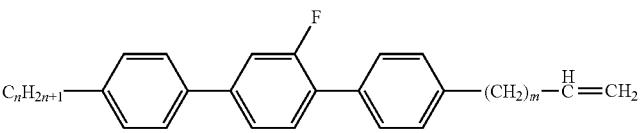 PGP-n-mV
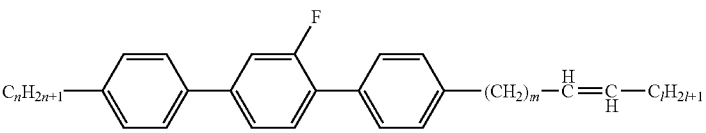 PGP-n-mVl
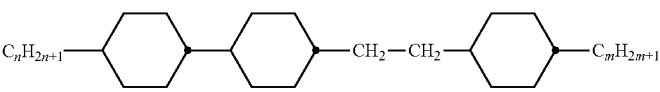 CCEC-n-m
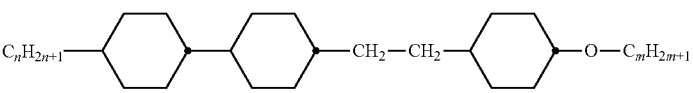 CCEC-n-Om
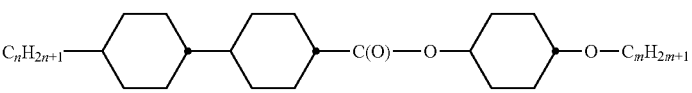 CCZC-n-Om
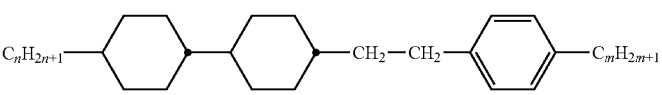 CCEP-n-m
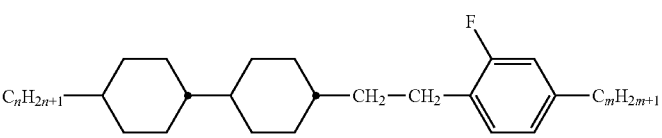 CCEGI-n-m TABLE D-continued
Illustrative structures
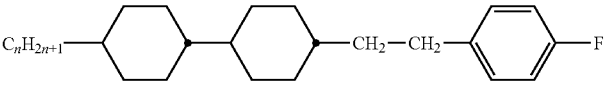 CCEP-n-F
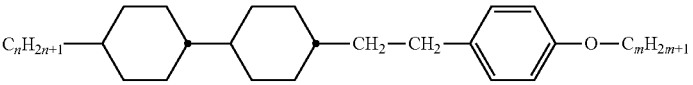 CCEP-n-Om
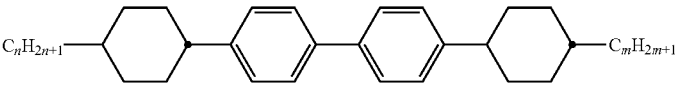 CPPC-n-m
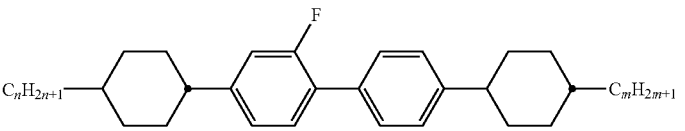 CGPC-n-m
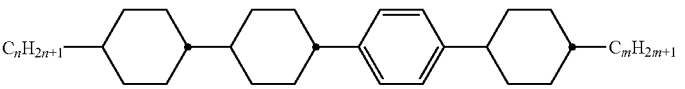 CCPC-n-m
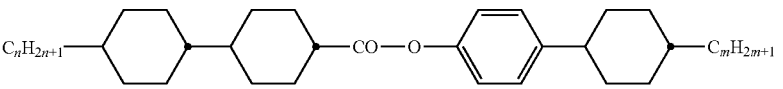 CCZPC-n-m
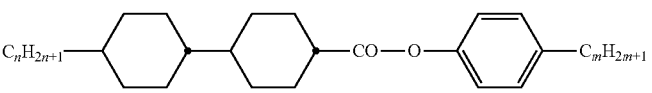 CCZP-n-m
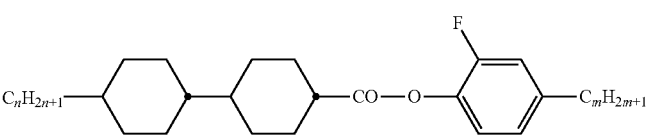 CCZGI-n-m
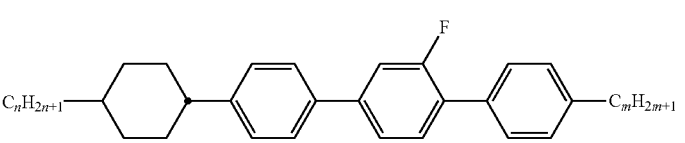 CPGP-n-m
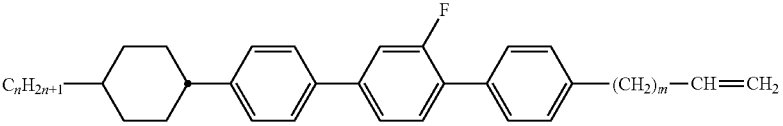 CPGP-n-mV
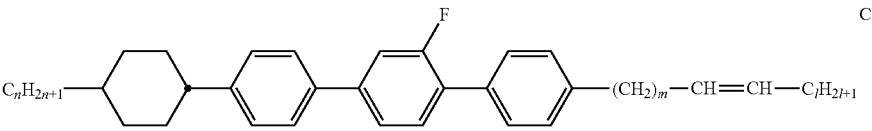 CPGP-n-mVI
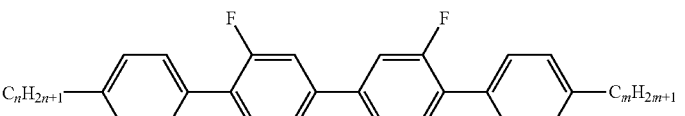 PGIGP-n-m
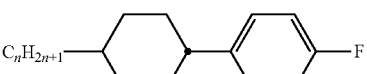 CP-n-F TABLE D-continued
Illustrative structures
| | |
|---|---|
| 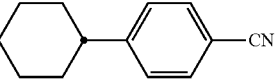 | CP-n-N |
| 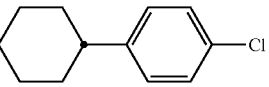 | CP-n-Cl |
| 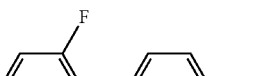 | GP-n-F |
| 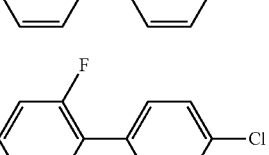 | GP-n-Cl |
| 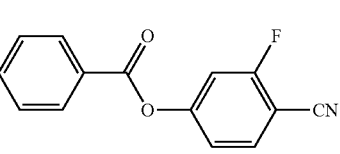 | PZG-n-N |
| 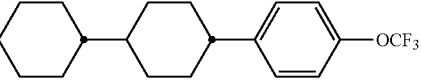 | CCP-n-OT |
| 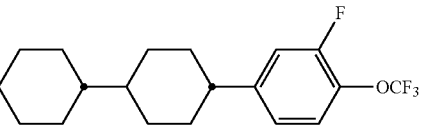 | CCG-n-OT |
| 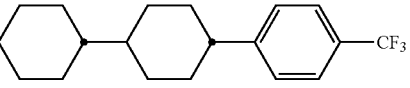 | CCP-n-T |
| 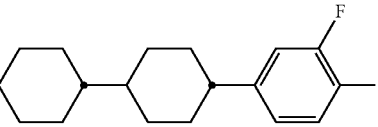 | CCG-n-F |
| 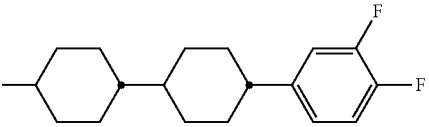 | CCG-V-F |
| 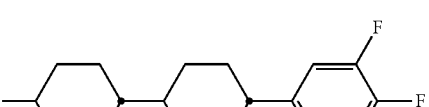 | CCG-V-F |
| 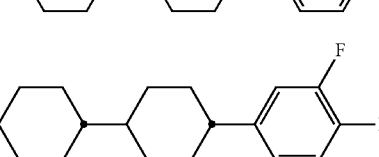 | CCU-n-F |

TABLE D-continued
Illustrative structures
| | |
|---|---|
| 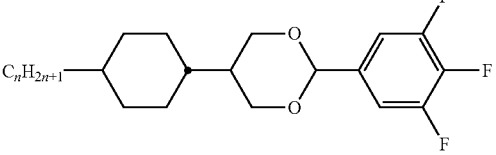 | CDU-n-F |
| 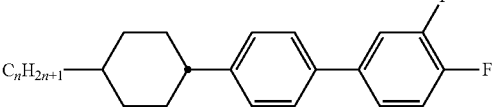 | CPG-n-F |
| 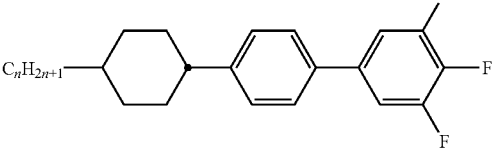 | CPU-n-F |
| 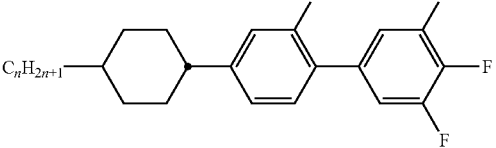 | CGU-n-F |
| 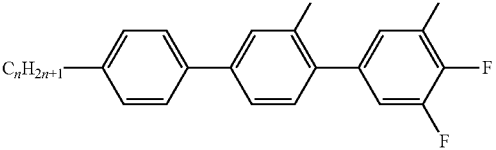 | PGU-n-F |
| 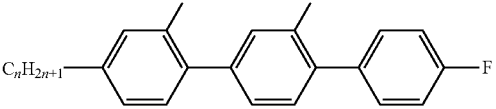 | GGP-n-F |
| 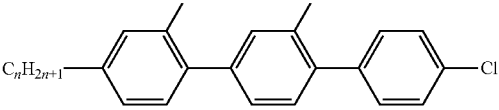 | GGP-n-Cl |
| 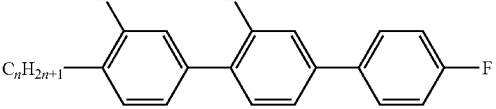 | GIGIP-n-F |
| 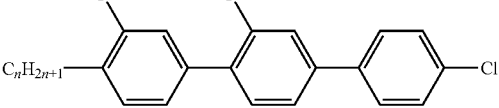 | GIGIP-n-Cl |
| 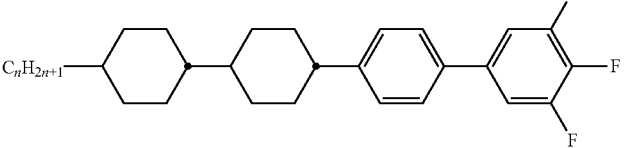 | CCPU-n-F |

TABLE D-continued
Illustrative structures
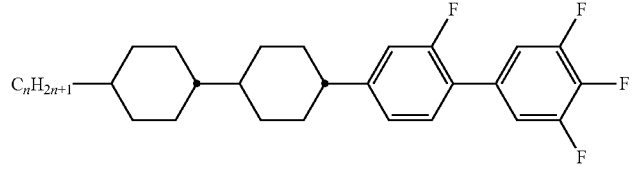 CCGU-n-F
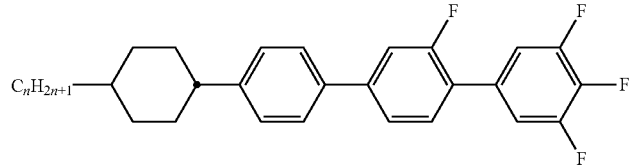 CPGU-n-F
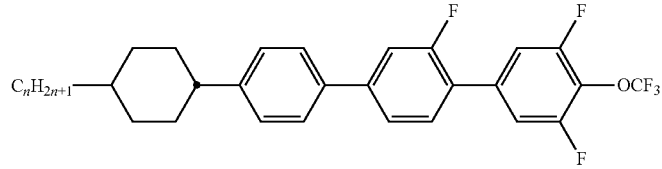 CPGU-n-OT
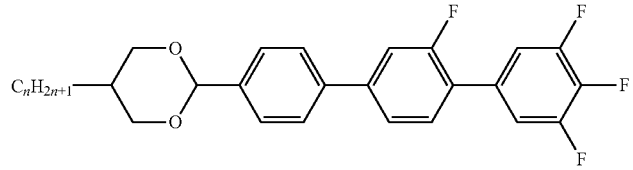 DPGU-n-F
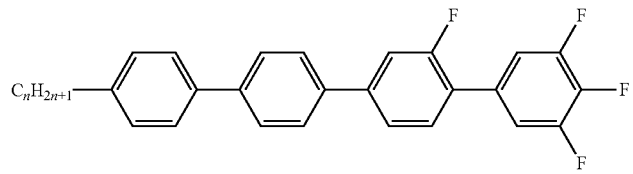 PPGU-n-F
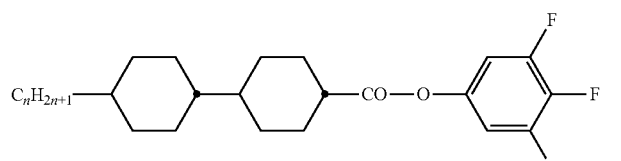 CCZU-n-F
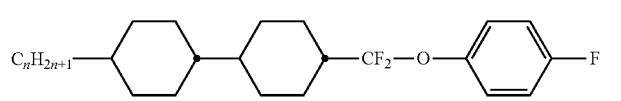 CCQP-n-F
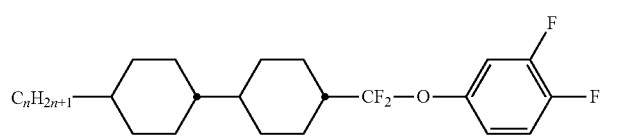 CCQG-n-F
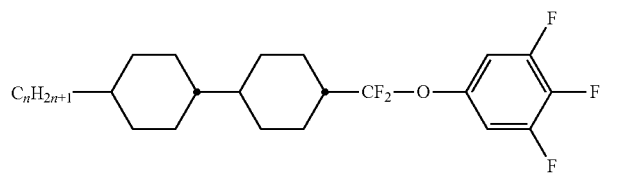 CCQU-n-F TABLE D-continued Illustrative structures

| Structure | Name |
|---|---|
| $C_nH_{2n+1}$—[phenyl]—[phenyl]—$CF_2$—O—[3,4-difluorophenyl] | PPQG-n-F |
| $C_nH_{2n+1}$—[phenyl]—[phenyl]—$CF_2$—O—[3,4,5-trifluorophenyl] | PPQU-n-F |
| $C_nH_{2n+1}$—[phenyl]—[3-fluorophenyl]—$CF_2$—O—[3,4,5-trifluorophenyl] | PGQU-n-F |
| $C_nH_{2n+1}$—[2-fluorophenyl]—[3-fluorophenyl]—$CF_2$—O—[3,4,5-trifluorophenyl] | GGQU-n-F |
| $C_nH_{2n+1}$—[phenyl]—[3,5-difluorophenyl]—$CF_2$—O—[3,4,5-trifluorophenyl] | PUQU-n-F |
| $C_nH_{2n+1}$—[pyrimidinyl]—[3,5-difluorophenyl]—$CF_2$—O—[3,4,5-trifluorophenyl] | MUQU-n-F |
| $C_nH_{2n+1}$—[pyridinyl]—[3,5-difluorophenyl]—$CF_2$—O—[3,4,5-trifluorophenyl] | NUQU-n-F |
| $C_nH_{2n+1}$—[cyclohexyl]—[dioxanyl]—[2,6-difluorophenyl]—$CF_2$—O—[3,4,5-trifluorophenyl] | CDUQU-n-F |
| $C_nH_{2n+1}$—[cyclohexyl]—[phenyl]—[2,6-difluorophenyl]—$CF_2$—O—[3,4,5-trifluorophenyl] | CPUQU-n-F |

TABLE D-continued

Illustrative structures

| Structure | Code |
|---|---|
| (cyclohexyl-C_nH_{2n+1})–(2-F phenyl)–(3,5-F phenyl)–CF_2–O–(3,4,5-F phenyl) | CGUQU-n-F |
| C_nH_{2n+1}–(phenyl)–(2-F phenyl)–(phenyl)–CF_2–O–(4-F phenyl) | PGPQP-n-F |
| C_nH_{2n+1}–(phenyl)–(2-F phenyl)–(phenyl)–CF_2–O–(3,4-F phenyl) | PGPQG-n-F |
| C_nH_{2n+1}–(phenyl)–(2-F phenyl)–(phenyl)–CF_2–O–(3,4,5-F phenyl) | PGPQU-n-F |
| C_nH_{2n+1}–(phenyl)–(2-F phenyl)–(3,5-F phenyl)–CF_2–O–(3,4,5-F phenyl) | PGUQU-n-F |
| C_nH_{2n+1}–(tetrahydropyran)–(phenyl)–(3,5-F phenyl)–CF_2–O–(3,4,5-F phenyl) | APUQU-n-F |
| C_nH_{2n+1}–(dioxane)–(2-F phenyl)–(3,5-F phenyl)–CF_2–O–(3,4,5-F phenyl) | DGUQU-n-F |
| C_nH_{2n+1}–(cyclohexyl)–(2,3-F phenyl)–OC_mH_{2m+1} | CY-n-Om |
| C_nH_{2n+1}–(cyclohexyl)–(2,3-F phenyl)–C_mH_{2m+1} | CY-n-m |

TABLE D-continued
| Illustrative structures | |
|---|---|
| 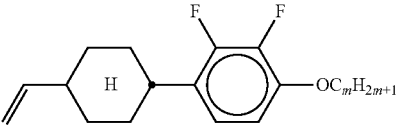 | CY-V-Om |
| 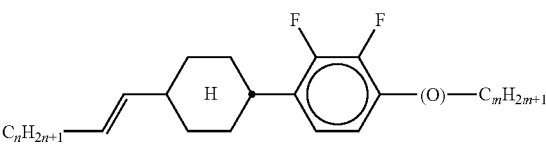 | CY-nV-(O)m |
| 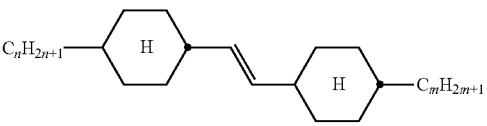 | CVC-n-m |
| 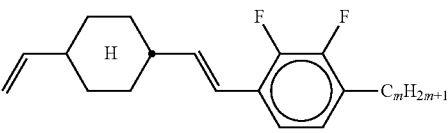 | CVY-V-m |
| 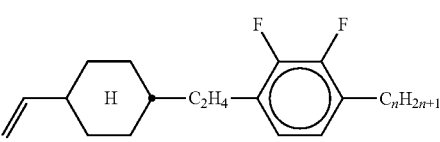 | CEY-V-m |
| 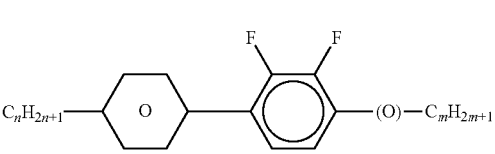 | PY-n-(O)m |
| 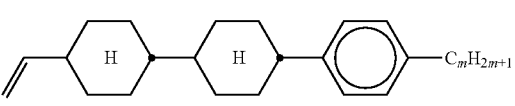 | CCP-V-m |
| 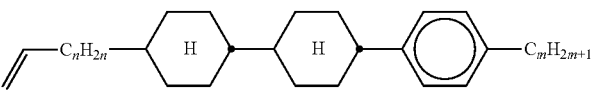 | CCP-Vn-m |
| 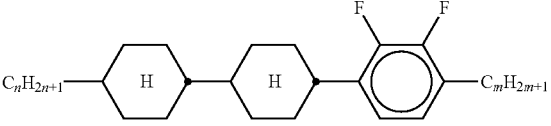 | CCY-n-m |
| 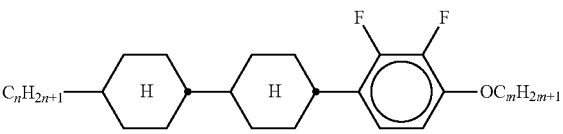 | CCY-n-Om |
| 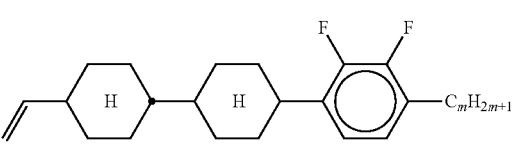 | CCY-V-m |

TABLE D-continued
| Illustrative structures | |
|---|---|
| 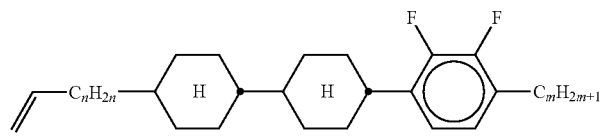 | CCY-Vn-m |
| 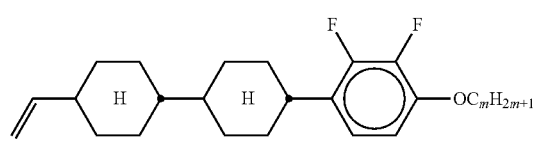 | CCY-V-Om |
| 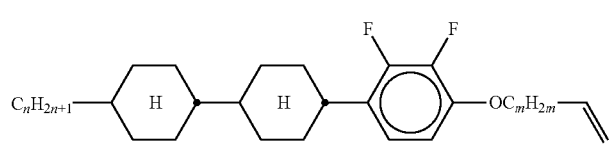 | CCY-n-OmV |
| 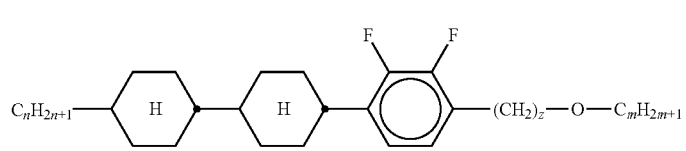 | CCY-n-zOm |
| 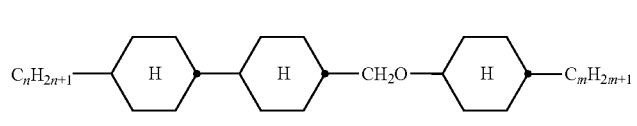 | CCOC-n-m |
| 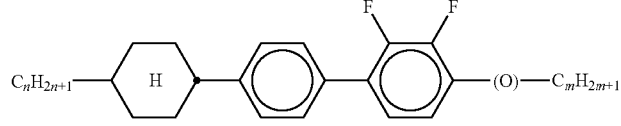 | CPY-n-(O)m |
| 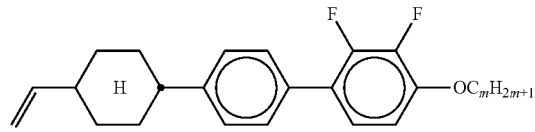 | CPY-V-Om |
| 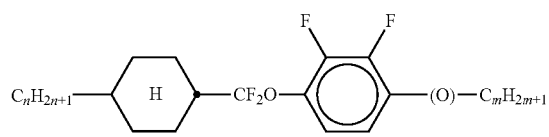 | CQY-n-(O)m |
| 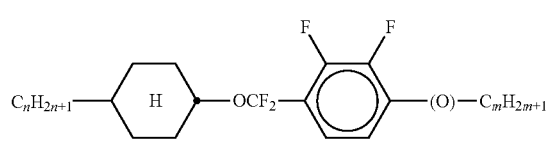 | CQIY-n-(O)m |
| 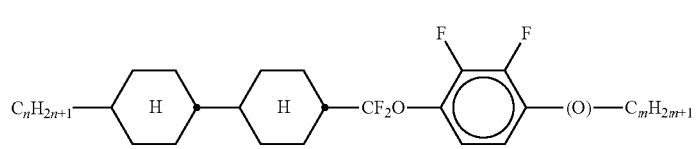 | CCQY-n-(O)m |
| 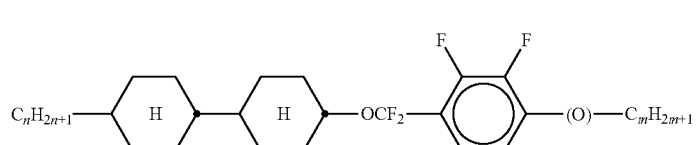 | CCQIY-n-(O)m |

TABLE D-continued

Illustrative structures

| Structure | Code |
|---|---|
| $C_nH_{2n+1}$—H—⟨phenyl⟩—CF$_2$O—⟨2,3-difluorophenyl⟩—(O)—$C_mH_{2m+1}$ | CPQY-n-(O)m |
| $C_nH_{2n+1}$—H—⟨phenyl⟩—OCF$_2$—⟨2,3-difluorophenyl⟩—(O)—$C_mH_{2m+1}$ | CPQIY-n-Om |
| $C_nH_{2n+1}$—H—⟨cyclohexyl⟩—⟨2,3-difluorophenyl⟩—(O)$C_mH_{2m+1}$ | CLY-n-(O)m |
| $C_nH_{2n+1}$—H—⟨2,3-difluorophenyl⟩—⟨cyclohexenyl⟩—$C_mH_{2m+1}$ | CYLI-n-m |
| $C_nH_{2n+1}$—⟨cyclohexenyl⟩—⟨2,3-difluorophenyl⟩—⟨cyclohexenyl⟩—$C_mH_{2m+1}$ | LYLI-n-m |
| $C_nH_{2n+1}$—⟨cyclohexenyl⟩—⟨2,3-difluorophenyl⟩—(O)—$C_mH_{2m+1}$ | LY-n-(O)m |
| $C_nH_{2n+1}$—⟨phenyl⟩—⟨2-fluorophenyl⟩—⟨2-fluorophenyl⟩—F | PGIGI-n-F |
| $C_nH_{2n+1}$—⟨phenyl⟩—⟨2-fluorophenyl⟩—⟨phenyl⟩—$C_mH_{2m+1}$ | PGP-n-m |
| $C_nH_{2n+1}$—⟨phenyl⟩—⟨2,3-difluorophenyl⟩—⟨phenyl⟩—(O)—$C_mH_{2m+1}$ | PYP-n-(O)m |
| $C_nH_{2n+1}$—⟨phenyl⟩—⟨2,3-difluorophenyl⟩—⟨phenyl⟩—$C_mH_{2m}$—CH=CH$_2$ | PYP-n-mV |
| $C_nH_{2n+1}$—⟨2,3-difluorophenyl⟩—⟨phenyl⟩—⟨2,3-difluorophenyl⟩—$C_mH_{2m+1}$ | YPY-n-m |

TABLE D-continued

| Illustrative structures | |
|---|---|
| (structure) | YPY-n-mV |
| (structure) | BCH-nm |
| (structure) | BCH-nmF |
| (structure) | CPYP-n-(O)m |
| (structure) | CPGP-n-m |
| (structure) | CPYC-n-m |
| (structure) | CYYC-n-m |
| (structure) | CCYY-n-m |
| (structure) | CPYG-n-(O)m |
| (structure) | CBC-nm |
| (structure) | CBC-nmF |

TABLE D-continued
| Illustrative structures | |
|---|---|
| 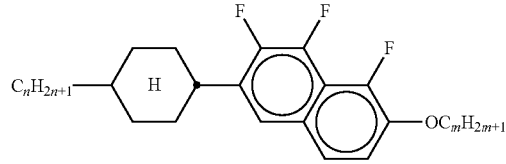 | CNap-n-Om |
| 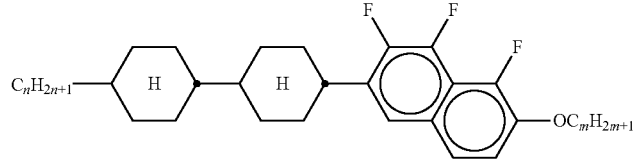 | CCNap-n-Om |
| 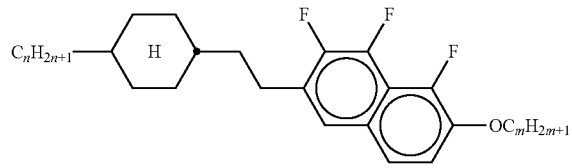 | CENap-n-Om |
| 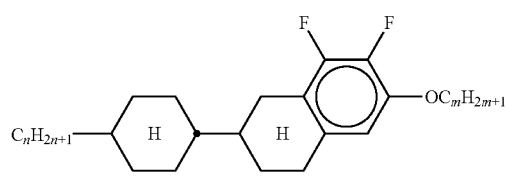 | TNap-n-Om |
| 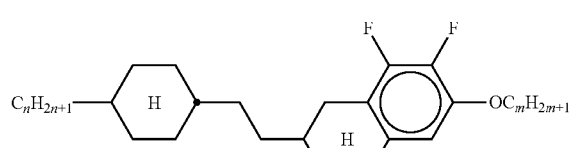 | CETNap-n-Om |
| 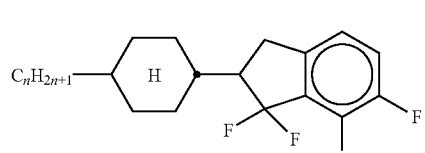 | CK-n-F |
| 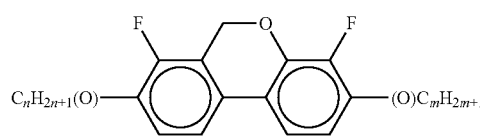 | DFDBC-n(O)-(O)m |
| 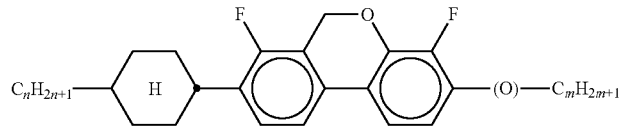 | C-DFDBF-n-(O)m |
| 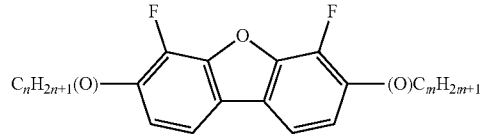 | B-n(O)-(O)m |

TABLE D-continued

Illustrative structures

| Structure | Code |
|---|---|
| $C_nH_{2n+1}(O)$—[dibenzothiophene with 2F]—$(O)C_mH_{2m+1}$ | B(S)-n(O)-(O)m |
| $C_nH_{2n+1}$—[cyclohexyl-cyclohexyl(CN)]—$C_mH_{2m+1}$ | CC(CN)-n-m |
| $C_nH_{2n+1}$—[cyclohexyl-cyclohexyl(CN)-cyclohexyl]—$C_mH_{2m+1}$ | CC(CN)C-n-m |
| $C_nH_{2n+1}$—[phenyl-phenyl-piperidinyl(CN)]—$C_mH_{2m+1}$ | PPC(CN)-n-m |
| $C_nH_{2n+1}$—[cyclohexyl-phenyl-phenyl(F,CN)]—O—$C_mH_{2m+1}$ | CPP(F,CN)-n-Om | in which n, m and l preferably, independently of one another, denote 1 to 9, more preferably 1 to 7.

In an embodiment the switching media, in particular the liquid-crystalline media, used according to the invention may contain one or more stabilizers, one or more chiral dopants and/or one or more dichroic dyes. In this respect, the following Table E shows illustrative and preferred compounds which can optionally be used in the media.

TABLE E

| Structure | Code |
|---|---|
| propyl-cyclohexyl-[2,6-di-tert-butylphenol] | ST-1 |
| $C_nH_{2n+1}$—[1,3-dioxane]—[3,5-di-tert-butyl-4-hydroxyphenyl], where n = 3 | ST-2 |

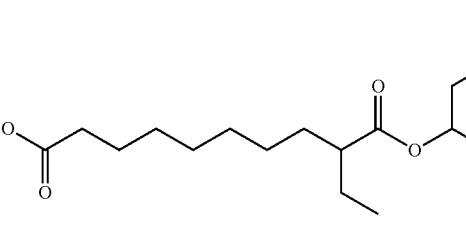

ST-3

TABLE E-continued
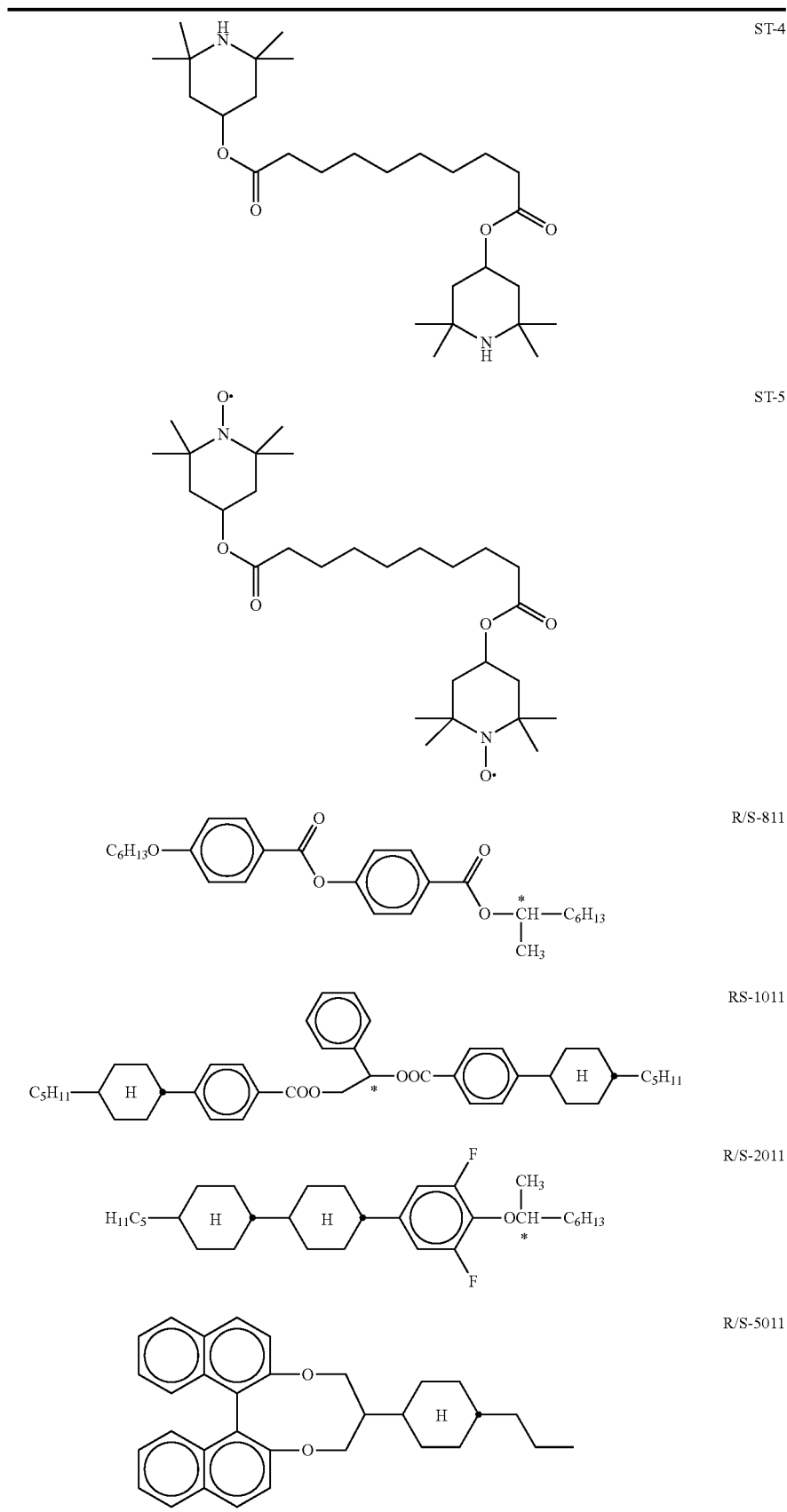

TABLE E-continued
| | |
|---|---|
| 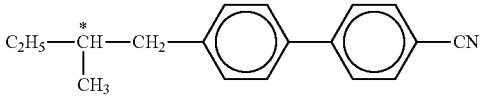 | CB 15 |
| 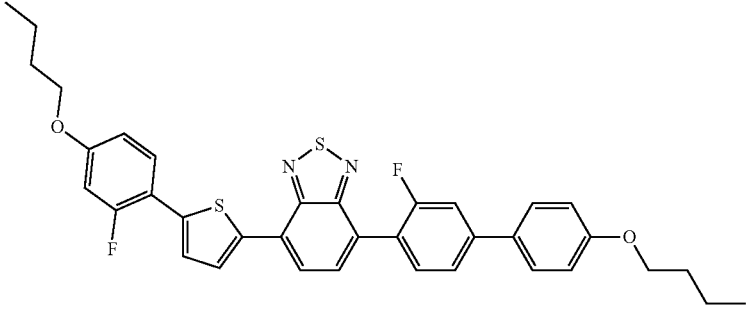 [SMILES: CCCCOc1ccc(-c2ccc(-c3ccc(-c4ccc(-c5ccc(OCCCC)cc5F)s4)c4nsnc34)c(F)c2)cc1] | D-1 |
| 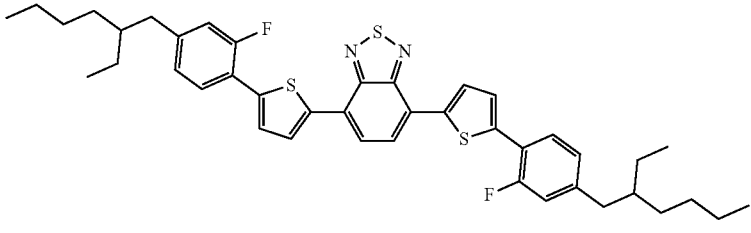 [SMILES: CCCCC(CC)Cc1ccc(-c2ccc(-c3ccc(-c4ccc(-c5ccc(CC(CC)CCCC)cc5F)s4)c4nsnc34)s2)c(F)c1] | D-2 |
| 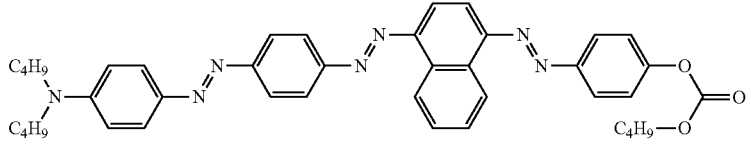 | D-3 |
| 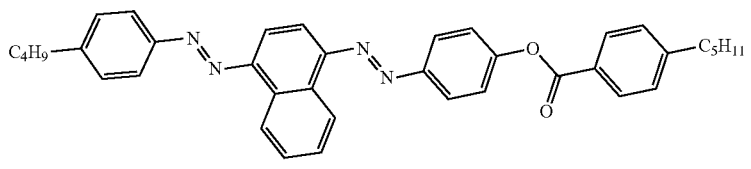 | D-4 |
| 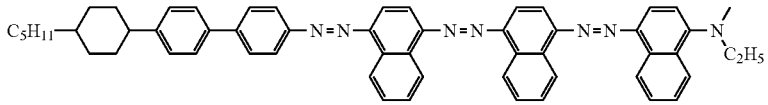 | D-5 |
| 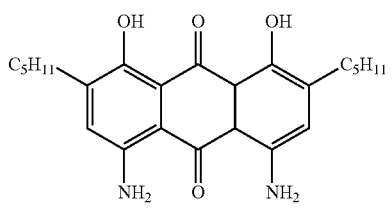 | D-6 |
| 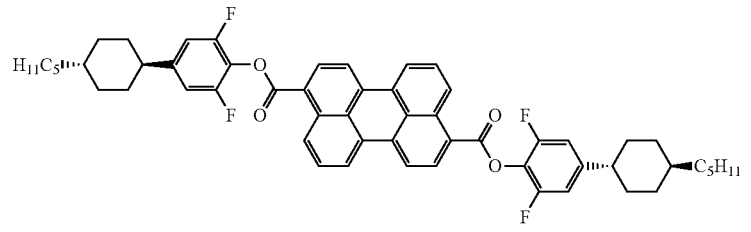 | D-7 |

TABLE E-continued
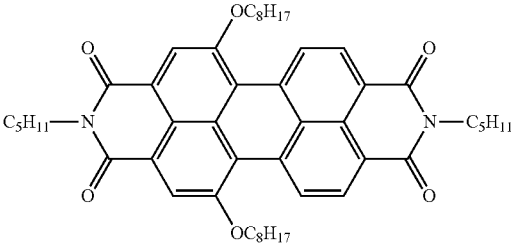 D-8
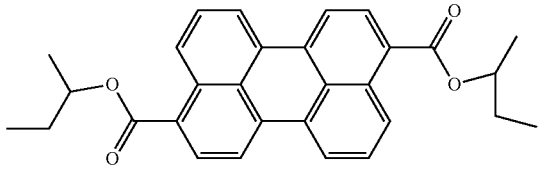 [SMILES: CCC(C)OC(=O)c1ccc2c3cccc4c(C(=O)OC(C)CC)ccc(c5cccc1c52)c43] D-9
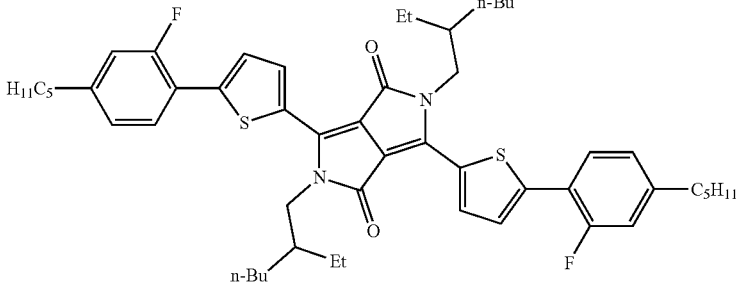 D-10
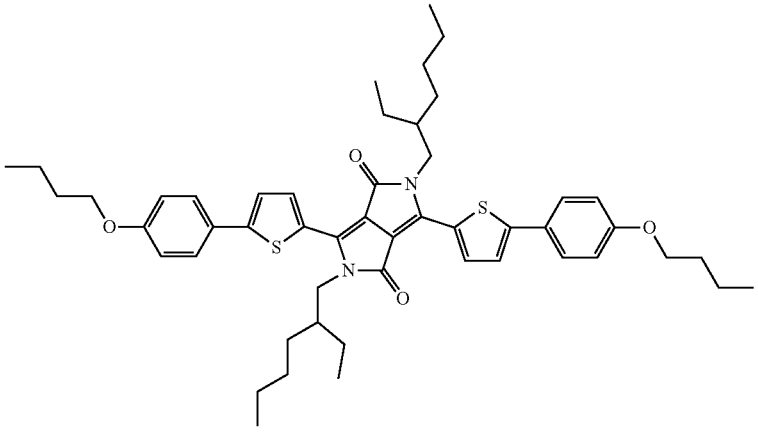 [SMILES: CCCCOc1ccc(-c2ccc(C3=C4C(=O)N(CC(CC)CCCC)C(c5ccc(-c6ccc(OCCCC)cc6)s5)=C4C(=O)N3CC(CC)CCCC)s2)cc1] D-11
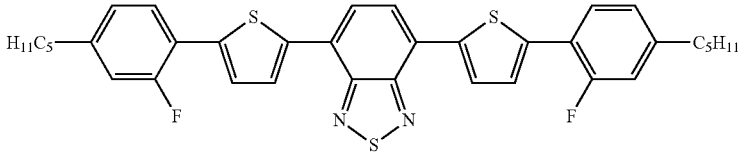 D-12
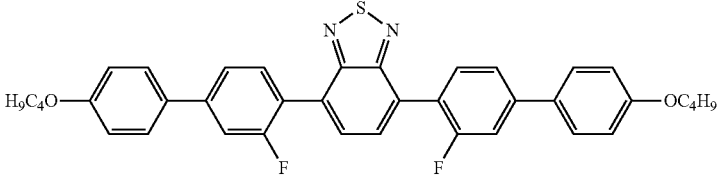 D-13

TABLE E-continued

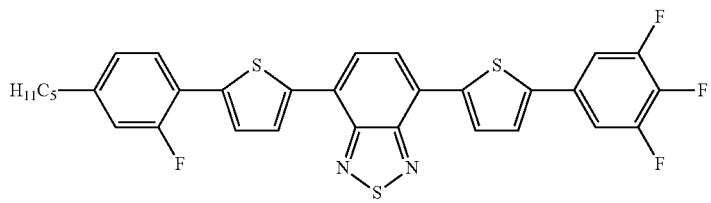

D-14

The liquid-crystalline media preferably comprise 0 to 10% by weight, in particular 1 ppm to 5% by weight, particularly preferably 1 ppm to 1% by weight, of stabilisers.

The liquid-crystalline media according to the present invention preferably comprise seven or more, preferably eight or more, individual compounds selected from the group of compounds from Table D, preferably three or more, particularly preferably four or more having different formulae selected from the formulae shown in Table D.

All percent data and amount ratios given herein are percent by weight unless explicitly indicated otherwise.

The following examples are merely illustrative of the present invention and they should not be considered as limiting the scope of the invention in any way. The examples and modifications or other equivalents thereof will become apparent to those skilled in the art in the light of the present disclosure.

EXAMPLES

In the Examples, $V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
$\Delta n$ denotes optical anisotropy at 20° C. and 589 nm,
$\varepsilon\|$ denotes dielectric permittivity parallel to the director at 20° C. and 1 kHz,
$\varepsilon\perp$ denotes dielectric permittivity perpendicular to the director at 20° C. and 1 kHz,
$\Delta\varepsilon$ denotes dielectric anisotropy at 20° C. and 1 kHz,
cl.p., T(N,I) denotes clearing point [° C.],
$\gamma_1$ denotes rotational viscosity measured at 20° C. [mPa·s], determined by the rotation method in a magnetic field,
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN], The term "threshold voltage" for the present invention relates to the capacitive threshold ($V_0$), unless explicitly indicated otherwise. In the Examples, as is generally usual, the optical threshold can also be indicated for 10% relative contrast ($V_{10}$).

Reference Example 1

A liquid-crystal base mixture B-1 is prepared and characterized with respect to its general physical properties, having the composition and properties as indicated in the following table.

| | | | |
|---|---|---|---|
| CPG-3-F | 5.00% | clearing point [° C.]: | 114.5 |
| CPG-5-F | 5.00% | Δn [589 nm, 20° C.]: | 0.135 |
| CPU-3-F | 15.00% | $n_e$ [589 nm, 20° C.]: | 1.63 |
| CPU-5-F | 15.00% | Δε [1 kHz, 20° C.]: | 11.3 |
| CP-3-N | 16.00% | $\varepsilon_\perp$ [1 kHz, 20° C.]: | 4.2 |
| CP-5-N | 16.00% | $K_1$ [pN, 20° C.]: | 13.4 |
| CCGU-3-F | 7.00% | $K_3$ [pN, 20° C.]: | 18.5 |
| CBC-33F | 4.00% | $V_0$ [V, 20° C.]: | 1.15 |
| CBC-53F | 4.00% | | |
| CBC-55F | 4.00% | | |
| CCZPC-3-3 | 3.00% | | |
| CCZPC-3-4 | 3.00% | | |
| CCZPC-3-5 | 3.00% | | |
| Σ 100.00% | | | |

A host mixture H-1 is prepared by mixing 99.97% of mixture B-1 with 0.03% of the compound ST-1. A mixture M-1 is prepared by adding 0.17% of D-1, 0.26% of D-2, 0.09% of D-3, 0.17% of D4 and 0.20% of D-5 as given in Table E to the host mixture H-1.

Reference Example 2

A liquid-crystal host mixture H-2 is prepared and characterized with respect to its general physical properties, having the composition and properties as indicated in the following table.

| | | | |
|---|---|---|---|
| CPG-3-F | 8.00% | clearing point [° C.]: | 114 |
| CPG-5-F | 8.00% | Δn [589 nm, 20° C.]: | 0.130 |
| CPU-5-F | 14.00% | $n_e$ [589 nm, 20° C.]: | 1.62 |
| CPU-7-F | 11.00% | Δε [1 kHz, 20° C.]: | 10.0 |
| CP-5-N | 18.00% | $\varepsilon_\perp$ [1 kHz, 20° C.]: | 4.0 |
| CP-7-N | 13.00% | | |
| CCGU-3-F | 7.00% | | |
| CC-3-O3 | 2.00% | | |
| CBC-33F | 4.00% | | |
| CBC-53F | 4.00% | | |
| CBC-55F | 3.00% | | |
| CCZPC-3-3 | 3.00% | | |
| CCZPC-3-4 | 3.00% | | |
| CCZPC-3-5 | 2.00% | | |
| Σ 100.00% | | | |

A mixture M-2.1 is prepared by adding 0.05% of S-811, 0.03% of ST-1, 0.085% of D-3, 0.16% of D-4 and 0.21% of D-5 as given in Table E to mixture H-2.

A mixture M-2.2 is prepared by adding 0.1% of ST-2, 0.1% of ST-3, 0.33% of D-3, 0.58% of D-4 and 0.69% of D-5 as given in Table E to mixture H-2.

A mixture M-2.3 is prepared by adding 0.30% of ST-2, 0.25% of ST-3, 0.34% of D-3, 0.72% of D-4 and 0.87% of D-5 as given in Table E to mixture H-2.

A mixture M-2.4 is prepared by adding 0.10% of D-3, 0.17% of D-4 and 0.17% of D-5 as given in Table E to mixture H-2.

A mixture M-2.5 is prepared by adding 0.03% of ST-1, 1.0% of D-3, 1.7% of D-4 and 0.185% of D-5 as given in Table E to mixture H-2.

A mixture M-2.6 is prepared by adding 0.03% of ST-1, 0.05% of S-811, 0.13% of D-3, 0.27% of D-4 and 0.34% of D-5 as given in Table E to mixture H-2.

Reference Example 3

A liquid-crystal host mixture H-3 is prepared and characterized with respect to its general physical properties, having the composition and properties as indicated in the following table.

| | | | |
|---|---|---|---|
| CY-3-O2 | 9.00% | clearing point [° C.]: | 110.5 |
| CY-3-O4 | 9.00% | Δn [589 nm, 20° C.]: | 0.132 |
| CY-5-O2 | 12.00% | $n_e$ [589 nm, 20° C.]: | 1.62 |
| CY-5-O4 | 8.00% | Δε [1 kHz, 20° C.]: | −4.9 |
| CCY-3-O2 | 5.00% | $\varepsilon_\perp$ [1 kHz, 20° C.]: | 8.8 |
| CCY-3-O3 | 5.00% | $K_1$ [pN, 20° C.]: | 16.8 |
| CCY-4-O2 | 5.00% | $K_3$ [pN, 20° C.]: | 20.4 |
| CPY-2-O2 | 7.00% | $V_0$ [V, 20° C.]: | 2.14 |
| CPY-3-O2 | 6.00% | | |
| PYP-2-3 | 12.00% | | |
| CCP-V-1 | 6.00% | | |
| CCZPC-3-3 | 3.00% | | |
| CCZPC-3-4 | 3.00% | | |
| CBC-33F | 5.00% | | |
| CBC-53F | 5.00% | | |
| Σ 100.00% | | | |

A mixture M-3 is prepared by adding 0.030% of ST-1, 0.86% of S-811, 0.28% of D-3, 0.51% of D-4 and 0.79% of D-5 as given in Table E to mixture H-3.

Reference Example 4

A liquid-crystal host mixture H-4 is prepared and characterized with respect to its general physical properties, having the composition and properties as indicated in the following table.

| | | | |
|---|---|---|---|
| CY-3-O4 | 25.00% | clearing point [° C.]: | 75.4 |
| CCY-3-O2 | 6.00% | Δn [589 nm, 20° C.]: | 0.100 |
| CCY-3-O3 | 7.00% | $n_e$ [589 nm, 20° C.]: | 1.58 |
| CPY-2-O2 | 8.00% | Δε [1 kHz, 20° C.]: | −3.0 |
| CPY-3-O2 | 8.00% | $\varepsilon_\perp$ [1 kHz, 20° C.]: | 6.4 |
| PYP-2-3 | 3.00% | $K_1$ [pN, 20° C.]: | 12.8 |
| CC-3-V1 | 9.00% | $K_3$ [pN, 20° C.]: | 14.4 |
| CC-3-V | 25.00% | $V_0$ [V, 20° C.]: | 2.32 |
| BCH-32 | 9.00% | | |
| Σ 100.00% | | | |

A mixture M-4 is prepared by adding 0.054% of D-3, 0.10% of D-4 and 0.11% of D-5 as given in Table E to mixture H-4.

Reference Example 5

A liquid-crystal host mixture H-5 is prepared and characterized with respect to its general physical properties, having the composition and properties as indicated in the following table.

| | | | |
|---|---|---|---|
| CCU-1-F | 5.00% | clearing point [° C.]: | 85 |
| CCU-2-F | 8.00% | Δn [589 nm, 20° C.]: | 0.071 |
| CCU-3-F | 10.00% | $n_e$ [589 nm, 20° C.]: | 1.55 |
| CCQU-3-F | 11.00% | Δε [1 kHz, 20° C.]: | 4.2 |
| CCQU-5-F | 9.00% | $\varepsilon_\perp$ [1 kHz, 20° C.]: | 3.2 |
| CCZC-3-3 | 3.00% | | |
| CCZC-4-5 | 3.00% | | |
| CCZPC-3-5 | 3.00% | | |
| CC-3-O1 | 11.00% | | |
| CP-3-O1 | 12.00% | | |
| CC-3-V1 | 6.00% | | |
| CCP-V-1 | 10.00% | | |
| CC-5-V | 9.00% | | |
| Σ 100.00% | | | |

A mixture M-5 is prepared by adding 0.005% of D-3, 0.007% of D-4 and 0.008% of D-5 as given in Table E to mixture H-4.

Reference Example 6

A liquid-crystal host mixture H-6 is prepared and characterized with respect to its general physical properties, having the composition and properties as indicated in the following table.

| | | | |
|---|---|---|---|
| PGIGI-3-F | 10.00% | clearing point [° C.]: | 105 |
| CPG-2-F | 6.00% | Δn [589 nm, 20° C.]: | 0.160 |
| CPG-3-F | 7.00% | $n_e$ [589 nm, 20° C.]: | 1.66 |
| CPG-5-F | 5.00% | Δε [1 kHz, 20° C.]: | 11.4 |
| CPU-5-F | 10.00% | $\varepsilon_\perp$ [1 kHz, 20° C.]: | 4.3 |
| CPG-7-F | 10.00% | | |
| PGU-3-F | 4.00% | | |
| PGU-5-F | 7.00% | | |
| CCGU-3-F | 8.00% | | |
| CPP-3-2 | 4.00% | | |
| CBC-33F | 3.00% | | |
| CBC-53F | 3.00% | | |
| CBC-55F | 3.00% | | |
| CPGU-3-OT | 5.00% | | |
| CP-5-N | 15.00% | | |
| Σ 100.00% | | | |

A mixture M-6 is prepared by adding 0.11% of D-3, 0.22% of D-4 and 0.24% of D-5 as given in Table E to mixture H-4.

Reference Example 7

A liquid-crystal host mixture H-7 is prepared and characterized with respect to its general physical properties, having the composition and properties as indicated in the following table.

| | | | |
|---|---|---|---|
| CP-3-N | 6.00% | clearing point [° C.]: | 111.0 |
| CCY-3-O1 | 8.00% | Δn [589 nm, 20° C.]: | 0.191 |
| CCY-3-O2 | 11.00% | $n_e$ [589 nm, 20° C.]: | 1.70 |
| CPY-2-O2 | 12.00% | Δε [1 kHz, 20° C.]: | −2.9 |
| CPY-3-O2 | 15.00% | $\varepsilon_\perp$ [1 kHz, 20° C.]: | 9.0 |
| PGIGI-3-F | 8.00% | | |
| PY-3-O2 | 10.00% | | |
| PYP-2-3 | 15.00% | | |
| PYP-2-4 | 15.00% | | |
| Σ 100.00% | | | |

A mixture M-7 is prepared by adding 0.26% of D-3, 0.40% of D4 and 0.74% of D-5 as given in Table E to the host mixture H-7.

Reference Example 8

A liquid-crystal base mixture B-8 is prepared and characterized with respect to its general physical properties, having the composition and properties as indicated in the following table.

| | | | |
|---|---|---|---|
| GGP-5-Cl | 17.00% | Clearing point: | 101.0° C. |
| PGIGI-3-F | 7.00% | Δn [589 nm, 20° C.]: | 0.181 |
| CPG-2-F | 8.00% | $n_e$ [589 nm, 20° C.]: | 1.693 |
| CPG-3-F | 8.00% | Δε [1 kHz, 20° C.]: | 13.2 |
| CPG-5-F | 5.00% | $ε_\|$ [1 kHz, 20° C.]: | 18.0 |
| CGU-2-F | 7.00% | | |
| CGU-3-F | 7.00% | | |
| CGU-5-F | 4.00% | | |
| PGU-2-F | 8.00% | | |
| PGU-3-F | 8.00% | | |
| CPGU-3-F | 10.00% | | |
| CPP-3-2 | 5.00% | | |
| CGPC-3-3 | 3.00% | | |
| CGPC-5-3 | 3.00% | | |
| Σ 100.00% | | | |

A cholesteric mixture C-8 is prepared by mixing 97.01% of mixture B-8, 0.42% of R-5011 as shown in Table E above, 1.25% of compound of formula RM-A

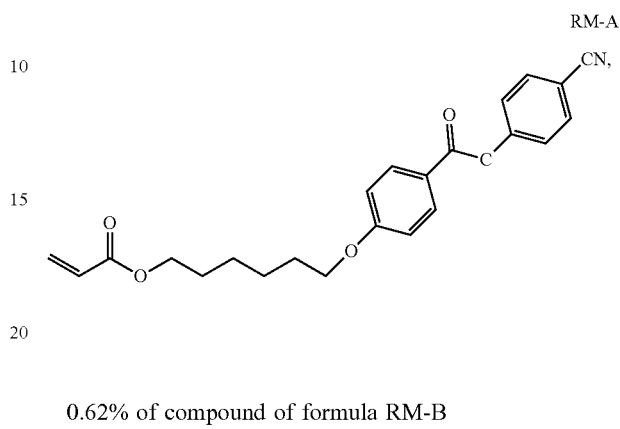

0.62% of compound of formula RM-B

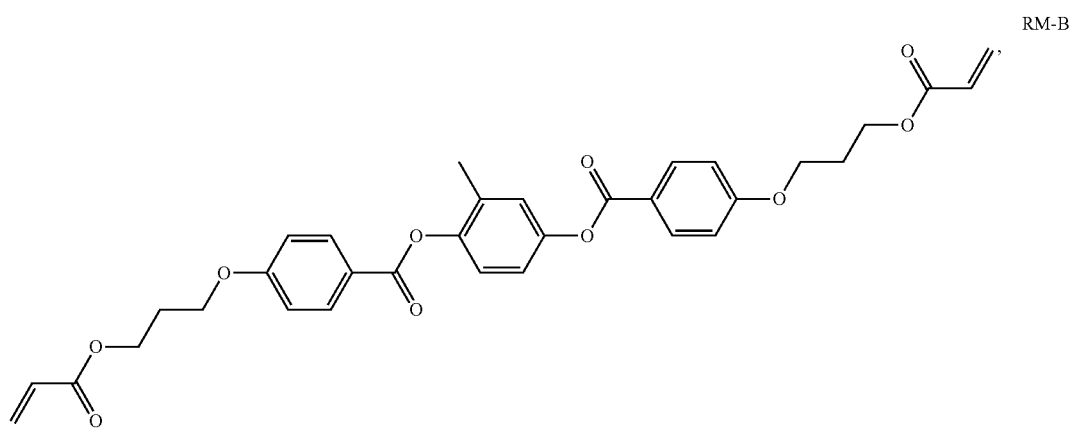 [SMILES: C=CC(=O)OCCCOc1ccc(C(=O)Oc2ccc(OC(=O)c3ccc(OCCCOC(=O)C=C)cc3)c(C)c2)cc1]

0.62% of compound of formula RM-C

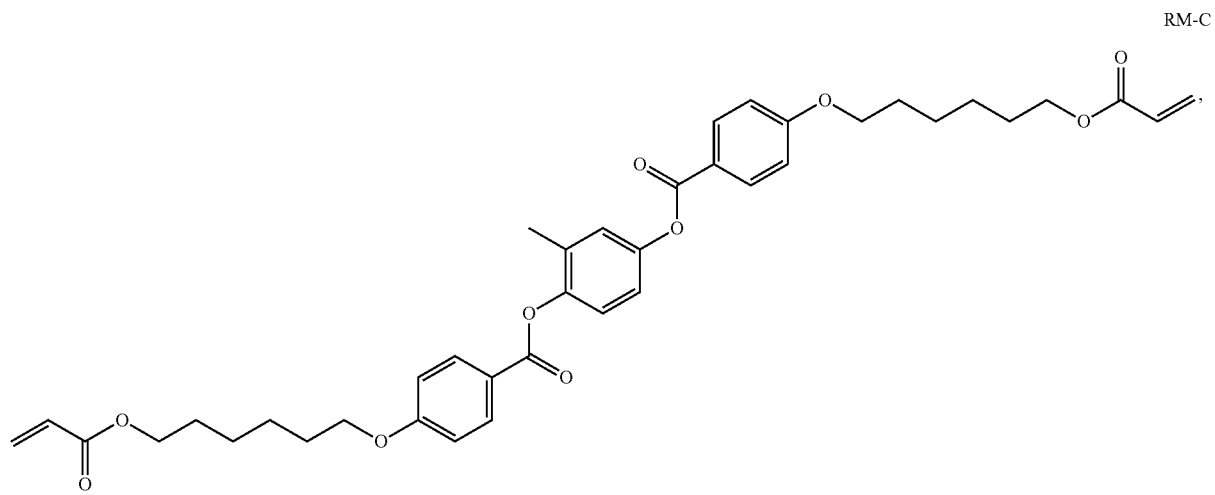 [SMILES: C=CC(=O)OCCCCCCOc1ccc(C(=O)Oc2ccc(OC(=O)c3ccc(OCCCCCCOC(=O)C=C)cc3)c(C)c2)cc1]

and 0.08% of Irgacure® 651

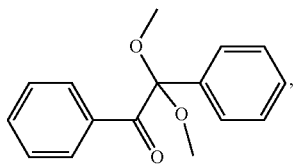 [SMILES: COC(OC)(C(=O)c1ccccc1)c1ccccc1]

available from Ciba, Switzerland.

The obtained pitch of mixture C-8 is 1.84 µm. The mixture is polymerised in the switchable device by irradiating with UV light (UVA and UVB, 3.5 mW/cm² light intensity) while a square-wave voltage (70V, 60 Hz) is applied.

Reference Example 9

A liquid-crystal base mixture B-9 is prepared, having the composition as indicated in the following table.

| | |
|---|---|
| CCGU-3-F | 8.00% |
| CPU-5-F | 10.00% |
| PGU-5-F | 7.00% |
| PGIGI-3-F | 10.00% |
| CPG-2-F | 6.00% |
| CPU-7-F | 10.00% |
| CPG-3-F | 7.00% |
| CBC-53F | 3.00% |
| CPG-5-F | 5.00% |
| CBC-55F | 3.00% |
| BCH-32 | 4.00% |
| CP-7-N | 15.00% |
| PGU-3-F | 4.00% |
| CPGU-3-OT | 5.00% |
| CBC-33F | 3.00% |
| Σ | 100.00% |

A cholesteric mixture C-9 is prepared by adding 0.03% of ST-1 and 0.45% of R-5011 as given Table E above and 0.75% of compound of formula RM-D

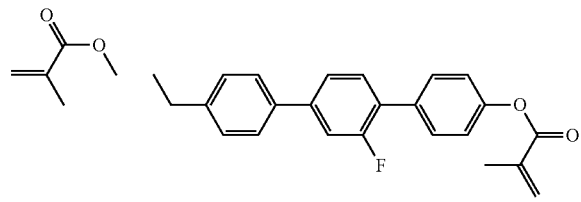

RM-D to the base mixture B-9.

The mixture is polymerised in the switchable device by irradiating with UV light (UVA and UVB, 3.5 mW/cm² light intensity) while a square-wave voltage (70V, 60 Hz) is applied.

Reference Example 10

A mixture M-10 is prepared by mixing 98.98% of mixture H-3 as shown in Reference Example 3 above, 0.08% of ST-1, 0.16% of D-3, 0.35% of D-4 and 0.43% of D-5 as given in Table E.

Examples 1 to 10

The mixtures as prepared in Reference Examples 1 to 10 are respectively filled and used in the cells of the switchable optical devices according to the invention.

LIST OF REFERENCE NUMERALS 1 switchable optical device
10 switchable medium
11 first substrate
12 second substrate
21 first transparent electrode
22 second transparent electrode
31 first busbar
32 second busbar
41 first edge
42 second edge
51 first conductive strip
52 second conductive strip
61 first terminal wire
62 second terminal wire
71 first region
72 second region
80 edge finish region
101 insulating material
103 conductive material
105 continuous soldered line
106 soldered dot
110 wire core
112 wire jacket
114 seal
116 edge deletion

The invention claimed is:

1. A switchable optical device (1) comprising: a first substrate (11), a second substrate (12) and a seal (114), the two substrates (11, 12) and the seal (114) being arranged such that a cell having a cell gap is formed, a switchable medium (10) being located inside the cell gap, the first substrate (11) having a first transparent electrode (21) and the second substrate (12) having a second transparent electrode (22), the electrodes (21, 22) facing towards the cell gap, the two substrates (11, 12) being arranged such that the first substrate (11) has a first region (71) adjacent to a first edge (41) of the first substrate (11) which does not overlap with the second substrate (12) and that the second substrate (12) has a second region (72) adjacent to a second edge (42) of the second substrate (12) which does not overlap with the first substrate (11), a first electrically conducting busbar (31) being arranged in the first region (71) and a second electrically conducting busbar (32) being arranged in the second region (72), and a first terminal being electrically connected to the first busbar (31) and a second terminal being electrically connected to the second busbar (32), wherein the first substrate (11) and the second substrate (12) each have an edge deletion (116) in which the transparent conductive electrodes (21, 22) are removed, wherein the edge deletion (116) is complete on the edges non-adjacent to a busbar (31, 32) and there is no or only partial edge deletion on edges adjacent to a busbar (31, 32).

2. The switchable optical device (1) according to claim 1, wherein the first busbar (31) is constructed as a continuous soldered line (105) in contact with the first transparent electrode (21) and arranged in the first region (71) and/or the second busbar (32) is constructed as a continuous soldered line (105) in contact with the second transparent electrode (22) and arranged in the second region (72).

3. The switchable optical device (1) according to claim 1, wherein the first busbar (31) is constructed as a first conductive strip (51) which electrically connects the first transparent electrode (21) in the first region (71) and/or the second busbar (32) is constructed as a second conductive strip (52) which electrically connects the second transparent electrode (22) in the second region (72).

4. The switchable optical device (1) according to claim 3, wherein the electrical connection between the first conductive strip (51) and the first transparent electrode (21) and/or the electrical connection between the second conductive strip (52) and the second transparent electrode (22) is achieved by a continuous soldered line (105), continuous welded line or by a continuous line of a conductive adhesive.

5. The switchable optical device (1) according to claim 3, wherein the electrical connection between the first conductive strip (51) and the first transparent electrode (21) and/or the electrical connection between the second conductive strip (52) and the second transparent electrode (22) is achieved by a plurality of soldered dots (106), weld spots or dots of a conductive adhesive distributed along the length of the respective conductive strip (51, 52).

6. The switchable optical device (1) according to claim 1, wherein the edge deletion (116) of the first substrate (11) further includes a portion at a first end and/or a second end of the first edge (41) and/or the edge deletion (116) of the second substrate (12) further includes a portion at a first end and/or a second end of the second edge (42), wherein the respective portion has a length parallel to the respective edge (41, 42) of at least 2 mm.

7. The switchable optical device (1) according to claim 6, wherein the first terminal is a first terminal wire (61) which is arranged parallel to the first edge (41) and the second terminal is a second terminal wire (62) which is arranged parallel to the second edge (42) and wherein the position and length of the first terminal wire (61) and/or the position and length of the second terminal wire (62) are chosen such that the first terminal wire (61) does not protrude from the first substrate (11) and/or the second terminal wire (62) does not protrude from the second substrate (12).

8. The switchable optical device (1) according to claim 6, wherein the first terminal is a first terminal wire (61) or an extension of the electrical conductive part of the busbar which is arranged parallel to the first edge (41) and the second terminal is a second terminal wire (62) or an extension of the electrical conductive part of the busbar which is arranged parallel to the second edge (42) and wherein the position and length of the first terminal wire (61) or the extension of the electrical conductive part of the busbar and/or the position and length of the second terminal wire (62) or the extension of the electrical conductive part of the busbar are chosen such that the first terminal wire (61) or the extension of the electrical conductive part of the busbar protrudes from the first substrate (11) and/or the second terminal wire (62) or the extension of the electrical conductive part of the busbar protrudes from the second substrate (12).

9. The switchable optical device (1) according to claim 8, wherein the wire or extension protrusion is applied with electrical insulation.

10. The switchable optical device (1) according to claim 1, wherein the edge finish of at least the first edge (41) of the first substrate (11) and/or of at least the second edge (42) of the second substrate (12) is a rounded edge, pencil edge, bevel edge or arrised edge.

11. The switchable optical device (1) according to claim 1, wherein an electrically insulating material (101) is arranged on the first substrate (11) such that a portion of the first transparent electrode (21) located in the first region (71) and the first busbar (31) are encapsulated by the insulating material (101) and/or an electrically insulating material (101) is arranged on the second substrate (12) such that a portion of the second transparent electrode (22) located in the second region (72) and the second busbar (32) are encapsulated by the insulating material (101).

12. The switchable optical device (1) according to claim 11, wherein the insulating material (101) is selected from single component epoxy materials, two component epoxy adhesives, single component silicone materials, two component silicone adhesives, acrylate sealants, polyurethanes, hot melt sealants, UV curing sealants, and a combination of at least two of said materials.

13. The switchable optical device (1) according to claim 1, wherein the first terminal and/or the second terminal are configured as terminal wires (61, 62) having an electrically insulating jacket (112).

14. The switchable optical device (1) according to claim 1, wherein a top coating is applied to the first transparent electrode (21) and/or the second transparent electrode (22).

15. The witchable optical device (1) according to claim 1, wherein the first substrate (11) and second substrate (12) are of the same size and shape.

16. A method for designing a switchable optical device (1) according to claim 1, the method comprising: selecting the sheet resistance of the first transparent electrode (21) and the second transparent electrode (22) to be in the range of from 10 to 150 Ohm/square, and selecting the cell gap to be in the range of from 6 μm to 50 μm so that a RC time constant T of a circuit formed between the first terminal (61) and the second terminal (62) is in the range of from 50 ms to 1 μs.

17. A method for electrically driving a switchable optical device (1) according to claim 1, said method comprising: electrically connecting a signal source providing an AC driving signal is to the first terminal (61) and the second terminal (62), and generating an AC signal by the signal source, wherein the frequency of the AC signal is chosen such that the period T of the AC signal is larger than τ, wherein τ is the RC time constant of an RC circuit formed by the arrangement of the first transparent electrode (21), the second transparent electrode (22) and the switchable medium (10).

18. A method for manufacturing of a switchable optical device (1) according to claim 1, said method comprising:
providing a first substrate (11) having a first transparent electrode (21) and a second substrate (12) having a second transparent electrode (22),
performing edge deletion on the first substrate (11) and on the second substrate (12) wherein the transparent conductive electrodes (21, 22) are removed in an area adjacent to the substrate edges, the edge deletion (116) of the first substrate (21) being only partial for at least a first edge (41) and complete for all further edges of the first substrate (21) and the edge deletion (116) of the second substrate (22) being only partial for at least a second edge (42) and complete for all further edges of the second substrate (22)
arranging the first substrate (11), the second substrate (12) and a seal (114) such that a cell having a cell gap is formed, and filing the cell with at least one switchable medium (10), the two substrates (11, 12) being arranged such that the first substrate (11) has a first region (71) adjacent to the first edge (41) of the first substrate (11) which does not overlap with the second substrate (12) and that the second substrate (12) has a second region (72) adjacent to the second edge (42) of the second substrate (12) which does not overlap with the first substrate (11), optionally pre-cleaning the portion of the first transparent electrode (21) located in the first region (71) and the portion of the second transparent electrode (22) located in the second region (72), optionally pre-heating at least the first region (71) of the first substrate (11) and/or pre-heating at least the second region (72) of the second substrate (12), connecting a first busbar (31) to the first transparent electrode (21) and connecting a second busbar (32) to the second transparent electrode (22), optionally bonding a first terminal (61) to the first busbar (31) and bonding of a second terminal (62) to the second busbar (32), dispensing of an insulating material (101) on the first substrate (11) such that the portion of the first transparent electrode (21) located in the first region (71) and the first busbar (31) are encapsulated by the insulating material (101) and/or on the second substrate (12) such that the portion of the second transparent electrode (22) located in the second region (72) and the second busbar (32) are encapsulated by the insulating material (101), curing of the insulating material (101), and optionally laminating of a glass sheet to the exposed face of the first substrate (11) and/or the second substrate (12) by means of an interlayer.

19. A system comprising at least one switchable optical device (1) according to claim 1 and at least one controller for applying an AC driving to the at least one switchable optical device, wherein the controller is configured to implement a driving method comprising: electrically driving the switchable optical device (1) according to claim 1, wherein a signal source providing an AC driving signal is electrically connected to the first terminal (61) and the second terminal (62) and an AC signal is being generated by the signal source, wherein the frequency of the AC signal is chosen such that the period T of the AC signal is larger than $\tau$, wherein $\tau$ is the RC time constant of an RC circuit formed by the arrangement of the first transparent electrode (21), the second transparent electrode (22) and the switchable medium (10).

* * * * *